United States Patent [19]
Maeda et al.

[11] Patent Number: 5,463,718
[45] Date of Patent: Oct. 31, 1995

[54] LEARNING METHOD AND APPARATUS

[75] Inventors: Akira Maeda, Sagamihara; Yoshikane Sugimura, Hitachi; Motohisa Funabashi, Sagamihara; Toshihiko Nakano, Ibaraki; Ryuko Someya, Kawasaki; Michitaka Kosaka, Sagamihara, all of Japan

[73] Assignee: Hitachi, Ltd., Tokyo, Japan

[21] Appl. No.: 971,065

[22] Filed: Nov. 3, 1992

[30] Foreign Application Priority Data

Nov. 8, 1991 [JP] Japan .................................. 3-292687
Mar. 4, 1992 [JP] Japan .................................. 4-046750

[51] Int. Cl.⁶ .............................. G06F 15/18; G06F 9/44
[52] U.S. Cl. .................. 395/23; 375/61; 375/76; 375/900
[58] Field of Search ........................ 395/20, 23, 61, 395/76, 900

[56] References Cited

U.S. PATENT DOCUMENTS

| | | | |
|---|---|---|---|
| 5,140,523 | 8/1992 | Frankel et al. | 359/22 |
| 5,142,665 | 8/1992 | Bigus | 395/23 |
| 5,235,673 | 8/1993 | Austvold et al. | 395/22 |
| 5,239,260 | 8/1993 | Yamakawa et al. | 359/61 |
| 5,267,348 | 11/1993 | Someya et al. | 395/61 |
| 5,313,559 | 5/1994 | Ogata et al. | 395/76 |

OTHER PUBLICATIONS

Nakajima, "Architecture of the Neurol Network Simulation Accelerator Neurosim 12", Int'l Neur Net Conf, Jul. 9–13, 1990 pp.722–725 vol. 2.

Maeda et al. "Self–Tuning Fuzzy Controller," Proceedings of the Society of Instrument and Control Engineers, vol. 24, No. 2, 1984, pp. 191–197. (provided in Japanese).

Kaneko et al. "Expert System for Investment based on Fuzzy Reasoning," Journal of Information Processing Society of Japan, vol. 30, No. 8, Aug. 1989, pp. 963–969. (provided in Japanese).

Maeda et al. "A Fast Learning Algorithm for Fuzzy Membership Functions," Symposium on Micro–Work Stations, Information Processing Society of Japan, vol. 66–5, May 1991, pp. 1–8. (provided in Japanese).

*Primary Examiner*—Robert W. Downs
*Attorney, Agent, or Firm*—Fay, Sharpe, Beall, Fagan, Minnich & McKee

[57] ABSTRACT

In a learning method, training data and verification data each including a set of input and output values are taken as teacher data, and a change of an error between an output value calculated by use of the input data of the verification data and the output value of the verification data and a change of an error between an output value calculated by use of the input value of the training data and the output value of the training data are simultaneously displayed, thereby preventing an overlearning and reducing the number of times of learning. Also in the learning method, fuzzy knowledge data is inputted and displayed, a range of the object of learning is interactively designated from among the displayed fuzzy knowledge, and a learning is made on the basis of a predetermined learning algorithm to change the fuzzy knowledge in the designated range, thereby performing the learning of a fuzzy knowledge with a user's intention reflected.

2 Claims, 18 Drawing Sheets

FIG. 8A

| PRO-POSITION No. | SUBJECT | PREDICATE | | LEARNING FLAG$_p$ | EDIT FLAG$_p$ |
|---|---|---|---|---|---|
| 1 | AVERAGE LINE | ASCENDING | | | O |
| 2 | DEGREE OF DISPARITY | UNDERLYING | | | I |
| 3 | FORECAST | RISE | | | O |
| 4 | AVERAGE LINE | DESCENDING | | | O |
| 5 | DEGREE OF DISPARITY | OVERLYING | | | I |
| 6 | FORECAST | FALL | | | O |
| 7 | DEGREE OF DISPARITY | A LITTLE OVERLYING | | | I |
| 8 | FORECAST | LITTLE FALL | | | O |
| 9 | DEGREE OF DISPARITY | A LITTLE UNDERLYING | | | I |
| 10 | FORECAST | LITTLE RISE | | | O |

301, 303, 304, $R_{max}$, $\leftarrow p$

FIG. 8B

| RULE No. | TYPE | NUMBER OF PROPOSITIONS | PROPOSITION NUMBER | |
|---|---|---|---|---|
| 1 | if | 2 | 1 | 2 |
| | then | 1 | 3 | |
| 2 | if | 2 | 4 | 5 |
| | then | 1 | 6 | |
| 3 | if | 2 | 1 | 7 |
| | then | 1 | 8 | |
| 4 | if | 2 | 4 | 9 |
| | then | 1 | 10 | |

302, $NI_r$, $PR_{ri}$, $NT_r$, $R_{max}$

F I G. 13
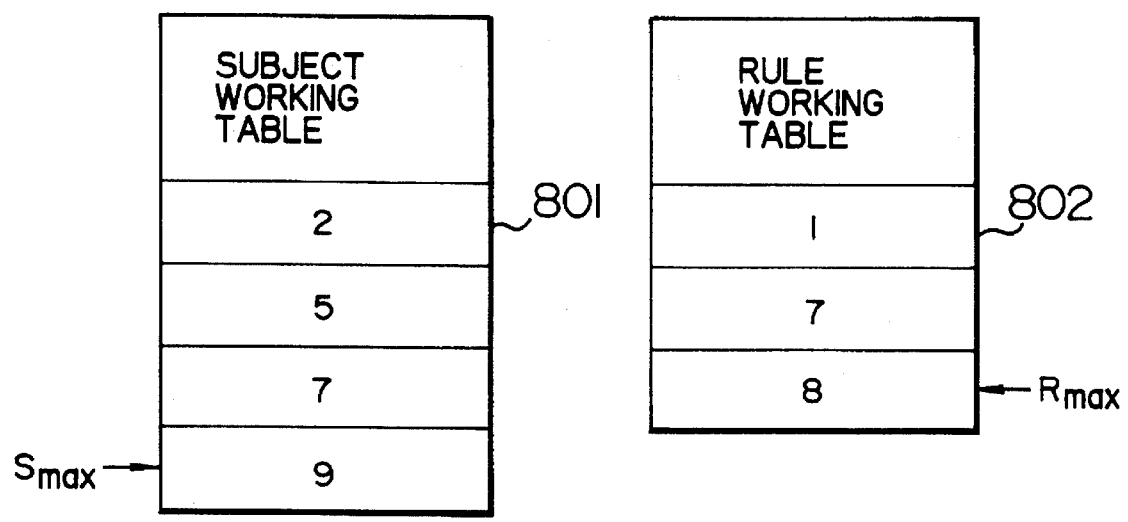

FIG. 15

| | LEARNING | COMPLETION |

| RULE NUMBER | "if" PORTION | | "then" PORTION |
|---|---|---|---|
| | AVERAGE LINE | DEGREE OF DISPARITY | FORECAST |
| 1 | ○ ASCENDING | UNDERLYING | RISE |
| 2 | DESCENDING | OVERLYING | FALL |
| 3 | ○ ASCENDING | A LITTLE OVERLYING | LITTLE FALL |
| 4 | DESCENDING | A LITTLE UNDERLYING | LITTLE RISE |

○···OBJECT OF LEARNING

FIG. 16

| | LEARNING | COMPLETION |

| RULE NUMBER | "if" PORTION | | "then" PORTION |
|---|---|---|---|
| | AVERAGE LINE | DEGREE OF DISPARITY | FORECAST |
| 1 | ASCENDING | ○ UNDERLYING | RISE |
| 2 | DESCENDING | ○ OVERLYING | FALL |
| 3 | ASCENDING | ○ A LITTLE OVERLYING | LITTLE FALL |
| 4 | DESCENDING | ○ A LITTLE UNDERLYING | LITTLE RISE |

○···OBJECT OF LEARNING

FIG. 17

| RULE NUMBER | "if" PORTION | | "then" PORTION |
|---|---|---|---|
| | AVERAGE LINE | DEGREE OF DISPARITY | FORECAST |
| 1 | ○ ASCENDING | UNDERLYING | RISE |
| 2 | DESCENDING | OVERLYING | FALL |
| 3 | ○ ASCENDING | ○ A LITTLE OVERLYING | ○ LITTLE FALL |
| 4 | DESCENDING | A LITTLE UNDERLYING | LITTLE RISE |

LEARNING  COMPLETION

○ ··· OBJECT OF LEARNING

LEARNING METHOD AND APPARATUS

BACKGROUND OF THE INVENTION

The present invention relates to a learning method for a learning apparatus in which teacher data including a set of input and output values is prepared, an output value for the input value of any given teacher data is calculated in accordance with a predetermined calculation method, and the calculation method is adjusted so as to approximate the calculated output value to the output value of the given teacher data, and more particularly to such a learning method in which a learning is interactively advanced to prevent an overlearning, thereby saving the operator's labor. The present invention further relates to a learning method for fuzzy knowledge which can suitably be applied to a general fuzzy inference or reasoning system.

The adjustment of weightings or threshold values in a neural network or the adjustment of membership functions in a fuzzy inference has hitherto been made using a learning apparatus in which teacher data including a set of input and output values for an object to be learned is prepared, an output value for the input value of any given teacher data is calculated in accordance with a predetermined calculation method, and the calculation method is adjusted so as to approximate the calculated output value to the output value of the given teacher data.

In such a learning apparatus, initialization is first made for the number of times of learning, a learning coefficient, etc. prior to the start of learning, as shown in FIG. 2 (see steps 2001 and 2002 in FIG. 2). Namely, in the case of the neural network, the construction of the network is given as an initial value. In the case of the fuzzy inference, the form of a membership function or a rule is given as an initial value. Next, given teacher data is divided into teacher data and verification data and an input value in the teacher data is used to calculate an output value by use of the neural network or the fuzzy inference. This procedure is repeated by the number of teacher data. The neural network or the membership function is adjusted using an error between the calculated output value and the output value of the teacher data. The above is repeated by the number of times of learning set as the initial value, thereby completing the learning (step 2003).

The judgement about the result of learning is made by the magnitude of the error for the teacher data or the magnitude of an error determined by calculating an output value with no learning but by use of the verification data in lieu of the teacher data (step 2004). If the result of learning is not satisfactory, the flow returns to step 2002 so that the learning is repeated with the initialization being changed.

A learning control apparatus making the adjustment of parameters by use of a fuzzy inference is disclosed by, for example, "Self-Adjusting Fuzzy Controller", Proceedings of the Society of Instrument and Control Engineers, Vol. 24, No. 2 (1984), pp. 191–197 (hereinafter referred to as reference 1).

When the learning is repeated by the method disclosed by the above reference 1, the problem of an overlearning occurs. The overlearning is such that a correct output value is obtained for an input value existing in teacher data but an output value greatly different from an output value of the teacher data regarded by a user as being proper is obtained for an input value which does not exist in the teacher data. In order to avoid this problem, a process including the determination of an initial value, the learning by teacher data and the examination of the result of learning by verification data must be repeated by the user until a satisfactory result of learning is obtained. Therefore, a lot of time and labor is required until the user obtains the satisfactory result of learning.

On the other hand, in a system in which a fuzzy inference is applied, a human knowledge is represented by a rule and a membership function. The represented version is generally called a fuzzy knowledge. The structuring of a fuzzy knowledge, especially, the determination of a membership function has hitherto been made in a trial-and-error manner.

Recently, however, the automatic adjustment of membership functions is reported by, for example, "Securities Investment Expert System Using Fuzzy Inference", Journal of Information Processing Society of Japan, August 1989, pp. 963–969 (hereinafter referred to as reference 2) and "Regarding System for High-Speed Learning of Membership Functions in Fuzzy Inference", Symposium on Micro-Work Stations, Information Processing Society of Japan, Vol. 66-5, May 1991 (hereinafter referred to as reference 3).

In the prior art disclosed by the reference 2, characteristic data is derived from among stock price data and the parameter of a membership function is changed on the basis of a distance from the present membership function parameter and a temporal distance between the instant of time of occurrence of the characteristic data and a learning time so that the parameter of the membership function is conformed to the derived characteristic data.

Also, the reference 3 discloses a membership function learning system based on an extended back propagation method.

The references 1 and 2 describe a method for automatic adjustment of membership functions but do not refer to the selection of a membership function to be learned.

As for a system in which a fuzzy inference is applied, an expert concerning that system exists in many cases. Therefore, on the basis of a know-how acquired from the expert (for example, through an interview with the expert) a fuzzy knowledge is structured which includes rules having their predetermined weightings and membership functions.

However, the fuzzy knowledge thus produced needs adjustment. A method for adjustment is generally classified into a method (1) in which the membership function and the weighting of the rule are automatically adjusted by use of a technique as disclosed by the reference 2 or 3 and a method (2) in which the adjustment is made in such a manner that the expert himself or herself examines the structure of the knowledge, for example, the missing or inconvenience of a rule. The method (1) or (2) is repeatedly applied to adjust the fuzzy knowledge.

A membership function may be regarded as defining the meaning of a proposition used in a rule. There are the case where a user himself or herself has already grasped the meaning of words clearly and the case where a user has not a complete grasp of the meaning of words but a membership function is tentatively defined and is determined in a trial-and-error manner in connection with data. In the former case, a membership function has already been determined upon initial input or the form of a membership is usually determined at an early stage of time even if the test and adjustment of the membership function are made. The similar holds for the setting of the weighting of a rule.

On the other hand, the fuzzy knowledge itself cannot be structured automatically, as is apparent from the adjustment method (2) mentioned above. Namely, the structure of the fuzzy knowledge must be made up or implemented by a user himself or herself.

In the process of automatic adjustment of a fuzzy knowledge, there may be the case where a part of case data having a probability of occurrence is used or the case where specified data is consciously used. In such a case, it is not preferable to automatically change all membership functions and the weightings of all rules.

Further, in the case where a fuzzy knowledge is made up while making interaction with a computer, there is a possibility that a lot of time may be required depending upon an algorithm used for adjustment of parameters of membership function or the like.

SUMMARY OF THE INVENTION

A first object of the present invention is to provide a learning method which has an improved man-machine interface and is suitable for prevention of an overlearning.

To achieve the above object, the present invention provides a learning method in which teacher data including input and output values is divided into teacher data and verification data, the teacher data is inputted to calculate an output value in accordance with a predetermined calculation method, and a parameter used in the calculation method is adjusted so as to approximate the calculated output value to the output value of the teacher data, characterized in that the teacher data and the verification data are inputted from teacher data input means and verification data input means and are stored into teacher data storage means and verification data storage means, and the change of an error between an output value calculated by use of the input value of the verification data and the output value of the verification data and the change of an error between an output value calculated by use of the input value of the teacher data and the output value of the teacher data are simultaneously displayed on error display means, for example, in the form of a graph.

The error for the output obtained from the teacher data and the error for the output obtained from the verification data may be used to successively evaluate the present state of learning in accordance with a criterion designated by evaluation method designation means (for example, a criterion for evaluation based on the square sum of errors). The object of learning evaluated as being the optimum may automatically be preserved or saved into best membership function storage means.

Interruption monitor means may be provided to temporarily stop the learning at any point of time in the course of learning and to evaluate and display the progress of learning until that point of time.

In the present invention, since the degree of progress of learning and the change of the error for verification data can simultaneously be observed by simultaneously displaying both the error for teacher data and the error for verification data graphically, it is possible to prevent an overlearning. This is because the error for teacher data generally exhibits a monotonic decrease with the increase of the number of times of learning even though a small increase may be observed whereas the error for verification data initially exhibits a decrease but is turned into an increase when the overlearning occurs.

Also, since the errors are successively examined during the learning and a parameter is automatically saved when the best result is obtained, it is possible to save a labor required in the conventional learning method in which a user memorizes the number of times of learning with which the best result has been obtained and the learning is repeated by that number of times again.

Accordingly, it is possible to improve an operability, thereby preventing the overlearning and enhancing the efficiency of working.

A second object of the present invention is to provide a learning method for fuzzy knowledge which can realize the learning of a fuzzy knowledge with a user's intention reflected and is capable of the more effective structuring and adjustment of a fuzzy knowledge.

To achieve the second object, fuzzy knowledge data is inputted and displayed, a range of the object of learning is interactively designated from among the displayed fuzzy knowledge, and a fuzzy knowledge in the designated range is changed by making a learning on the basis of a predetermined learning algorithm.

In a fuzzy inference system, an inference is made using a fuzzy knowledge which includes rules each described in an if-then form and having its weighting and the membership functions of propositions used in the "if" and "then" portions of each rule. In the present invention, any proposition or weighting of the fuzzy knowledge can be designated so that it is made the object of learning or out of the object of learning. This is achieved in such a manner that a fuzzy knowledge such as rules or propositions forming the rules are displayed, a user designates a proposition or a weighting to be learned, and the proposition or weighting to be learned is changed (or automatically adjusted) in accordance with a predetermined learning algorithm.

In one embodiment of the display or output of the fuzzy knowledge, the fuzzy knowledge is displayed or outputted in the form of a table. For example, the rule is represented in a longitudinal direction and the subject of a proposition or the weighting is represented in a lateral direction. In this case, the proposition of each rule is displayed by describing the name of a predicate at a corresponding portion of the table.

In one embodiment of a method of designating the object of learning, a portion, for which adjustment (or learning) is desired, is directly designated and the designated portion is made the object of learning. The object of learning may be designated in units of a subject or a rule. In the case where the object of learning is designated in units of a subject, propositions having the designated subject are all made the object of learning. In the case where the object of learning is designated in units of a rule, propositions forming the designated rule and the weighting of the designated rule are all made the object of learning.

The present state of the designated proposition or weighting may be inverted in accordance with whether or not the designated proposition or weighting has already been the object of learning. Not only the designation of the object of edition but also the change of the name of a proposition or the like being outputted on a display device may be made by an input device.

With the above construction, it is possible to designate any proposition and the weighting of any rule as the object of learning to change the membership function of the designated proposition and the designated weighting in accordance with a learning algorithm. Accordingly, a user's intention can be reflected in the learning of membership functions and the weightings of rules, thereby making it possible to interactively structure a fuzzy knowledge.

Also, the fuzzy knowledge can be displayed in the form of a table in which rule specifying information (for example, rule number) is taken as one item and subject or weighting is taken as another item. Predicates are displayed in the table. Accordingly, a user can easily grasp the structure of each rule. The object of learning can be designated not only in units of a proposition but also in units of a subject or a rule. Therefore, especially, in the case where a large-scale fuzzy knowledge is to be structured, the object of learning can be designated in a short time as compared with the case where propositions are designated one by one. As a result, the efficiency of working can be improved. The present state of a proposition made the object of edition is automatically inverted. Thereby, good convenience of use or operability is obtained.

Further, the fuzzy knowledge can directly be changed. Therefore, it is possible to flexibly cope with the state of adjustment or learning of the fuzzy knowledge. For example, in the case where a proposition is held in common by a plurality of rules, that proposition can easily be divided.

BRIEF DESCRIPTION OF THE DRAWINGS

FIG. 8A is a conceptual diagram showing a list of propositions used in rules used in the other embodiment of the present invention, a learning flag table and an edit flag table, and FIG. 8B is a conceptual diagram showing the construction of a list of rules in a fuzzy knowledge in the other embodiment of the present invention;

FIG. 13 is a conceptual diagram showing the construction of a subject working table and a predicate working table in the other embodiment of the present invention;

FIG. 15 shows an example of an output as displayed in the case where the object of learning is designated in units of a predicate in the other embodiment of the present invention;

FIG. 16 shows an example of an output as displayed in the case where the object of learning is designated in units of a subject in the other embodiment of the present invention;

FIG. 17 shows an example of an output as displayed in the case where the object of learning is designated in units of a rule in the other embodiment of the present invention;

DESCRIPTION OF THE PREFERRED EMBODIMENTS

Figure 3:
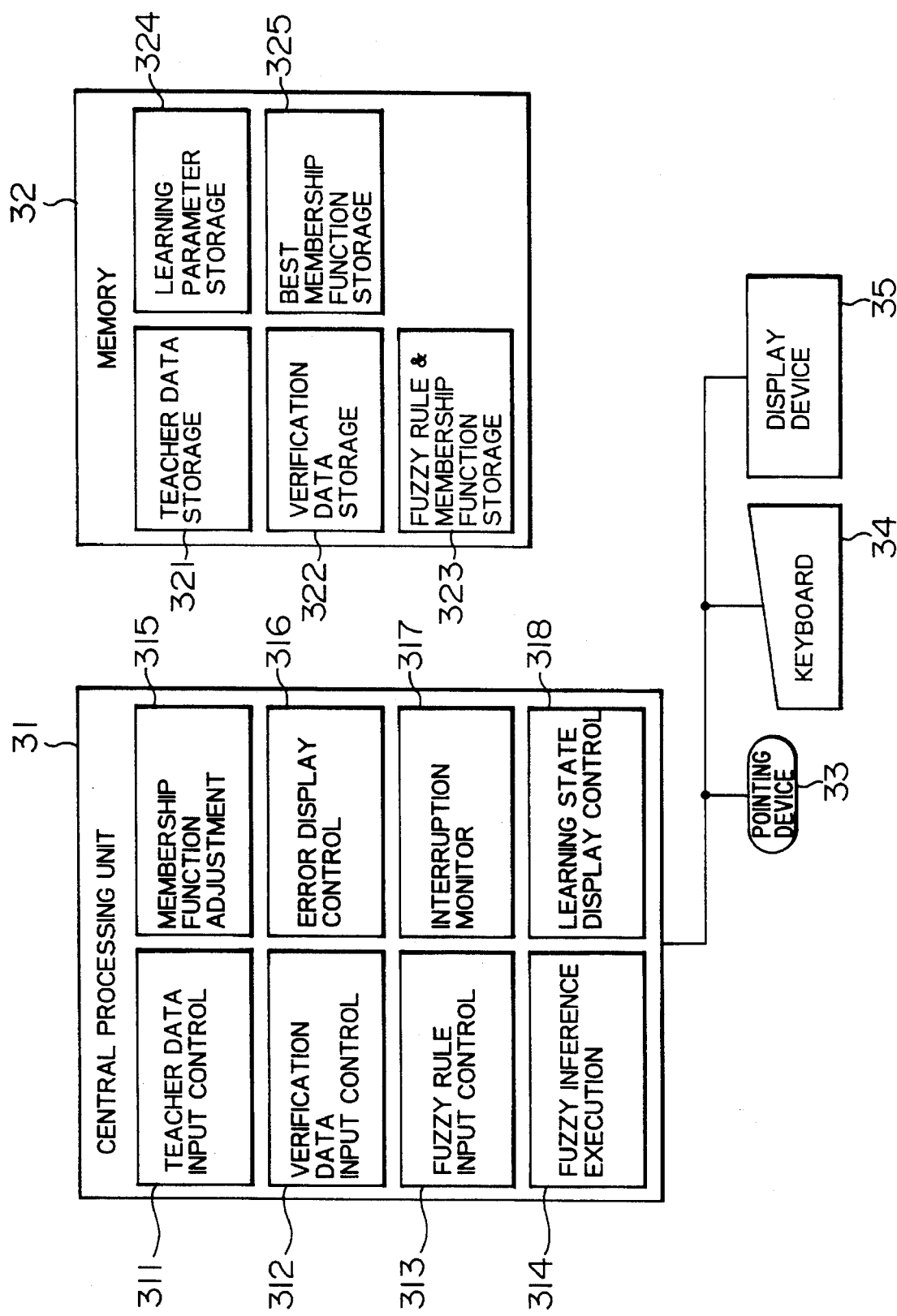
FIG. 3 is a block diagram showing the construction of a learning apparatus in the embodiment of the present invention.
Figure 4:
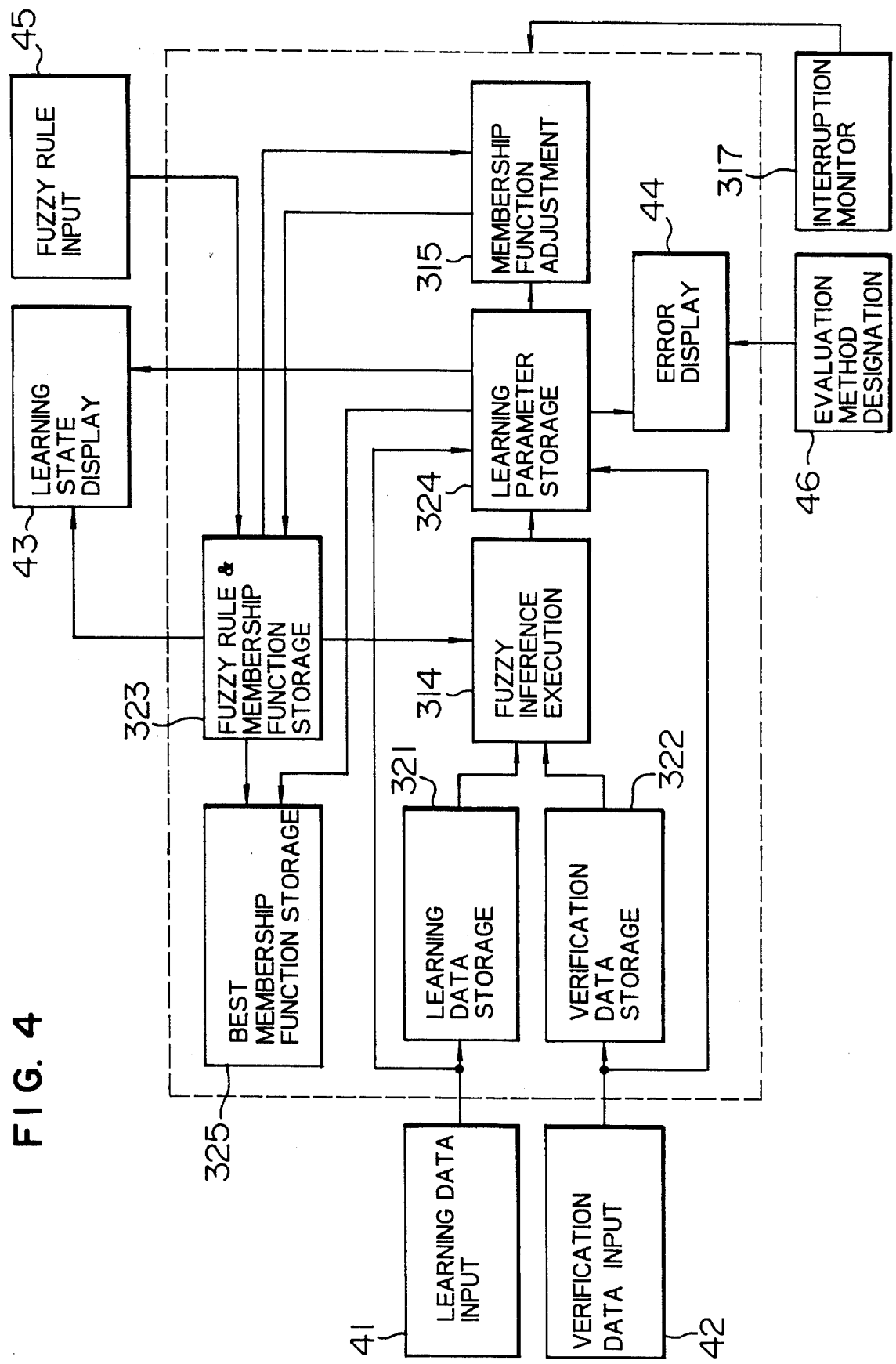
FIG. 4 is a block diagram showing the functional construction of the learning apparatus in the embodiment of the present invention.

FIG. 3 is a block diagram showing the construction of a learning apparatus in an embodiment of the present invention, and FIG. 4 is a block diagram showing the functional construction of the learning apparatus in the embodiment of the present invention.

In FIG. 3, reference numeral 31 denotes a central processing unit which includes teacher data input control means 311, verification data input control means 312, fuzzy rule input control means 313, fuzzy inference execution means 314, membership function adjustment means 315, error display control means 316, interruption monitor means 317 and learning state display control means 318. Numeral 32 denotes a memory having regions for storing programs which describe the operation of the central processing unit 31. The memory 32 includes storage regions which serve as teacher data storage means 321, verification data storage means 322, fuzzy rule and membership function storage means 323, learning parameter storage means 324 and best membership function storage means 325. Numeral 33 denotes a pointing device, numeral 34 a keyboard, and numeral 35 a display device. These devices 33, 34 and 35 are hardwares of a learning control system (or computer system) in the present embodiment. The pointing device 33, the keyboard 34 and the display device 35 cooperate with the teacher data input control means 311, the verification data input control means 312 and so on to realize the functions of teacher data input means 41 and verification data input means 42 shown in FIG. 4. The central processing unit 31 executes the programs stored in the memory 32 to realize the functions of the fuzzy inference execution means 314, the membership function adjustment means 315 and so on.

In FIG. 4, reference numeral 41 denotes teacher data input means for inputting teacher data which includes a set of input and output values for the object of learning, numeral 42 verification data input means for inputting verification data which includes a set of input and output values for the same object of learning, numeral 43 learning state display means for displaying the state of learning, numeral 44 error display means for simultaneously displaying an error in an inference using the teacher data and an error in an inference using the verification data, numeral 45 fuzzy rule input means for inputting fuzzy rules and the parameters of membership functions, and numeral 46 evaluation method designation means for inputting a method of evaluating the state of learning.

The teacher data storage means 321 stores the teacher data and the verification data storage means 322 stores the verification data. The fuzzy rule and membership function storage means 323 stores the fuzzy rule and the parameters of membership functions, the learning parameter storage means 324 stores an output value and the state of inference for each case of the teacher data or verification data, and the best membership function storage means 325 stores parameters of the best membership function. The fuzzy inference execution means 314 executes a fuzzy inference on the basis of an input value of the teacher data or verification data, the membership function adjustment means 315 adjusts the parameters of a membership function, and the interruption monitor means 317 monitors an interruption from the input device 33 or 34.

In the present embodiment, the adjustment of a membership function in a fuzzy inference is made with the above construction. The membership function herein used is defined by three to six parameters. The adjustment of the membership function means changing this parameter so that an output value obtained for an input value of teacher data approximates to an output value of teacher data.

Next, explanation will be made of the operation of each means shown in FIG. 4.

The teacher data storage means 321 stores teacher data inputted by a user from the teacher data input means 41. Similarly, the verification data storage means 322 stores verification data inputted from the verification data input means 42. Also, the fuzzy rule and membership function storage means 323 stores a fuzzy rule inputted from the fuzzy rule input means 45.

The fuzzy inference execution means 314 executes a fuzzy inference by use of an input value of the teacher data from the teacher data storage means 321 or an input value of the verification data from the verification data storage means 322 while referring to the fuzzy rule and membership function storage means 323. The fuzzy inference execution means 314 outputs the result of fuzzy inference as an output value. In the case of the teacher data, the output value is the state of inference. The state of inference may include the degree of matching of the antecedent of a rule, the state of synthesis of a membership function associated with the outputted inference state and a membership function of the consequent of the rule, and so on.

The learning parameter storage means 324 stores an error between the output value from the fuzzy inference execution means 314 and an output value of the teacher data or an output value of the verification data.

Based on the present information of the learning parameter storage means 24, the membership function adjustment means 315 adjusts parameters which determine the membership function of the fuzzy rule and membership function storage means 323.

The best membership function storage means 325 stores or copies the data of the fuzzy rule and membership function storage means 323 in accordance with an automatic saving mode based on the error for teacher data and the error for verification data from the learning parameter storage means 324 in the case where the data of the storage means is the best.

The error display means 44 calculates errors (for example, the square sum of errors based on each of the error for teacher data and the error for verification data from the learning parameter storage means 324) in accordance with the criterion for evaluation (such as the square sum of errors) inputted from the evaluation method designation means 46 and successively displays those errors in accordance with constants for scaling. The scaling constant is determined for each of the teacher data and the verification data so that an error at the time of the first inference is included in a display screen. The square sum of errors may be replaced by another value so long as the state of learning can be appreciated by it.

The interruption monitor means 317 monitors an input from the input device 33 or 34. If the input is present, the interruption monitor means 317 temporarily stops the learning to execute a command. In the present embodiment, there are commands which instruct the preservation of a fuzzy rule inclusive of membership functions, the evaluation for the state of learning and the continuation of learning, respectively.

In the case where the learning is stopped by the interruption monitor means 317, the learning state display means 43 evaluates the state of learning on the basis of the information of the learning parameter storage means 324 and the fuzzy rule and membership function storage means 323 at the point of time of temporary stoppage of the learning.

Figure 5:
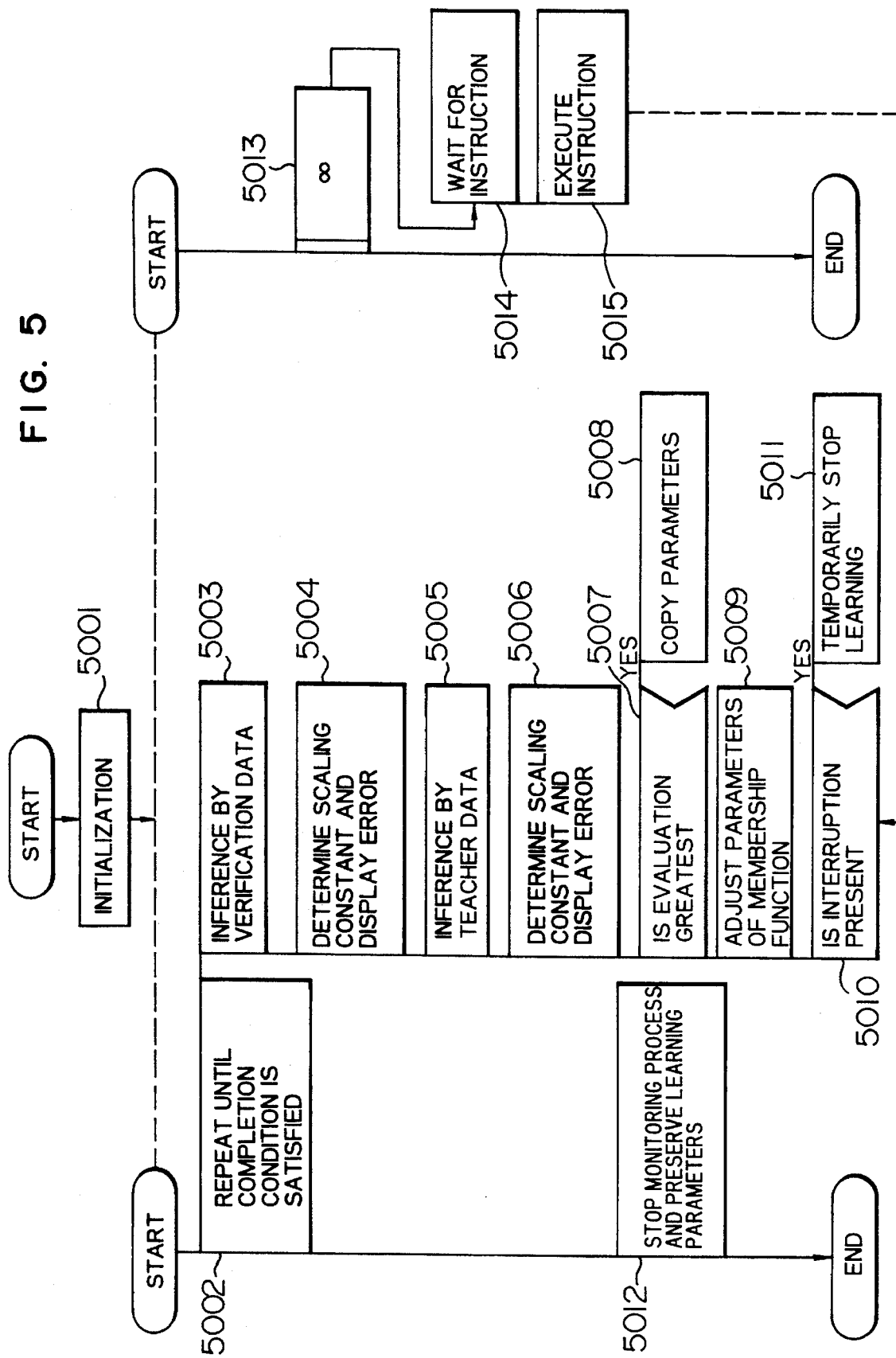
FIG. 5 is a PAD diagram showing a learning method in the embodiment of the present invention.

FIG. 5 is a PAD diagram showing a learning method in the embodiment of the present invention.

First, a user inputs a fuzzy rule, teacher data and verification data with the designation of a criterion for evaluation (such as the square sum of errors) and sets an automatic saving mode including the number of times of learning, a display interval, a learning coefficient, the coefficient of inertia and a completion condition (step 5001). The automatic saving mode may include the minimum verification data error (for example, the minimum square sum of errors), the minimum teacher data error (for example, the minimum square sum of errors), and so on. The contents of the fuzzy rule and membership function storage means 323 are copied by the best membership function storage means 325.

Thereafter, the process branches to two or a learning process (on and after step 5002) in which a learning is performed and a monitoring process (on and after step 5013) in which an interruption from the input devices 33 or 34 is monitored. In the present embodiment, implementation is made by use of a C language and a function fork ( ) is used for this operation.

In the learning process, an input value of teacher data from the verification data storage means 322 is inputted to the fuzzy inference execution means 314 to execute an inference and the result of inference is stored into the learning parameter storage means 324 (step 5003). This operation is performed by the number of verification data and output values are all stored.

Next, the calculation is made of the square sum of an error between an output value of the learning parameter storage means 324 for verification data and an output value of teacher data of the verification data storage means 322. Further, a scaling constant for error for verification data is determined from the calculated square sum in order to display a graph with a proper scale, and the graph is depicted in accordance with the determined scaling constant (step 5004). This constant is used when the error for verification data is displayed.

Next, an input value of teacher data from the teacher data storage means 321 is inputted to the fuzzy inference execution means 314 to execute an inference, and an output value and the state of inference necessary for the succeeding adjustment of membership function are inputted to the learning parameter storage means 324 and stored thereinto (step 5005). This operation is performed by the number of teacher data. An output value and the state of inference for each case are stored.

Next, in a manner similar to that in step 5004, the calculation is made of the square sum of an error between an output value of the learning parameter storage means 324 for teacher data and an output value of teacher data of the teacher data storage means 321. Further, a scaling constant for the error for teacher data is determined from the calculated square sum and the graph is depicted in accordance with the determined scaling constant (step 5006). This constant is used when the error for teacher data is displayed.

In the case where the evaluation according to the automatic saving mode based on the errors calculated in steps 5004 and 5006 shows that the present membership function learned is better than the membership function stored in the best membership function storage means 325 (step 5007), the contents of the fuzzy rule and membership function storage means 323 are copied into the best membership function storage means 325 (step 5008).

On the other hand, in the case where the evaluation in step 5007 is not the greatest or optimum, parameters defining the membership function of the fuzzy rule and membership function storage means 323 are adjusted by the membership function adjustment means 315 on the basis of data of the learning parameter storage means 324 and the fuzzy rule and membership function storage means 323 (step 5009).

Finally, the confirmation is made as to whether an instruction for temporary stoppage of learning is present or absent from the monitoring process (step 5010). If the instruction is present, the instruction is executed (step 5011). If the instruction is absent, the flow proceeds to the next.

Steps 5003 to 5011 are repeated until the completion condition is satisfied (step 5002). In the present embodiment, the completion condition is determined by the number of times of learning.

When the learning is thus completed, the monitoring process is stopped and parameters are saved into a file (step 5012), thereby completing the processing.

In the monitoring process, waiting for an instruction from the user is kept (step 5014). If the instruction is present, the contents of the instruction are sent as a message to the learning process (step 5015). This operation is repeated (step 5013).

Figure 1:
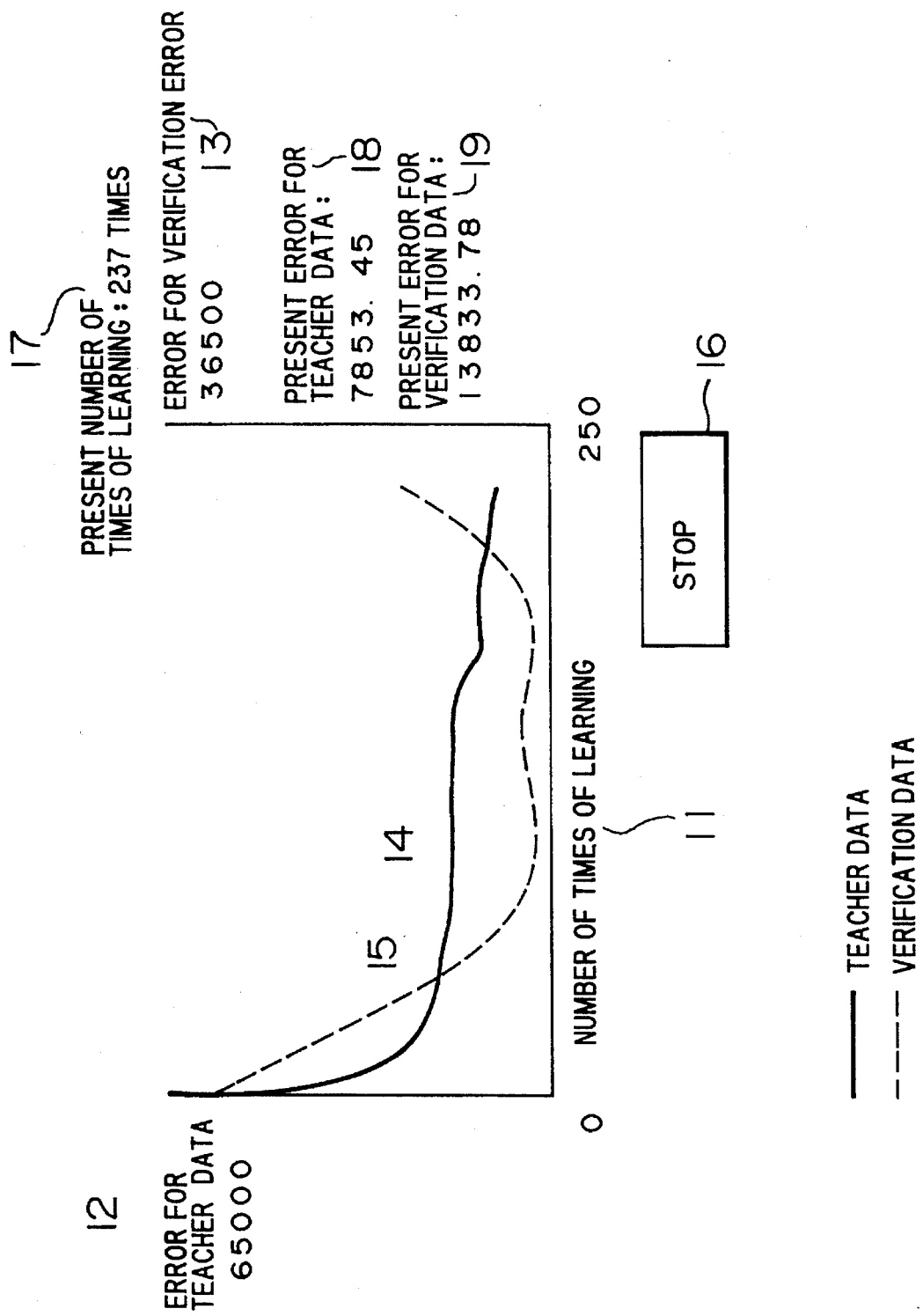
FIG. 1 is a diagram showing errors as displayed on a display device in an embodiment of the present invention.
Figure 2:
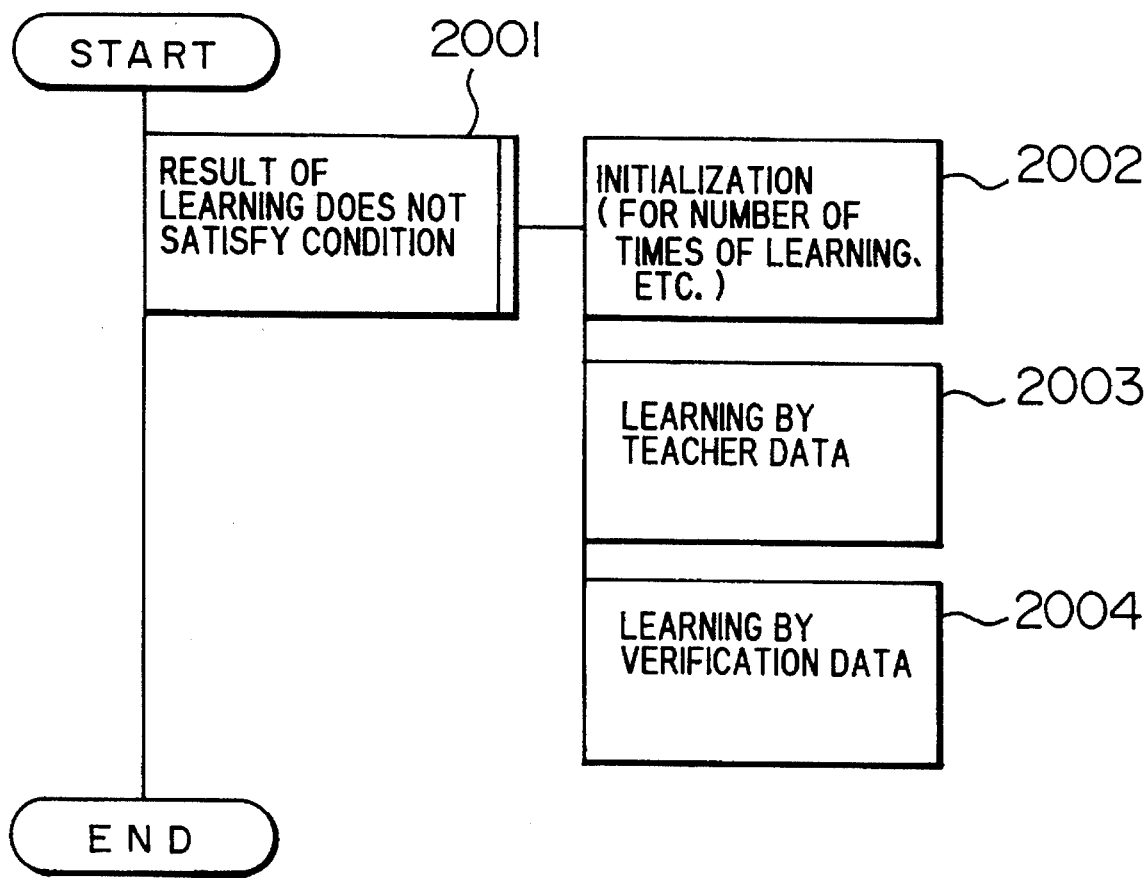
FIG. 2 is a PAD diagram showing the conventional learning method.

Next, a picture or image construction, in the case where simultaneous display of errors is made, will be explained using FIG. 1.

In the present embodiment, a graph is displayed at the central portion of a display screen. The number 11 of times of learning is taken along the abscissa, an error 12 for teacher data is taken along the left ordinate, and an error 13 for verification data is taken along the right ordinate. Solid line of the graph represents a change 14 in error for teacher data, and broken line thereof represents a change 15 in error for verification data. When a "STOP" display portion 16 is clicked by the pointing device in the course of learning, the learning is temporarily stopped, thereby making it possible to select a command for the evaluation for the state of learning, the preservation of parameters, the continuation of learning, or the like. Further, the present number 17 of times of learning, the present error 18 for teacher data and the present error 19 for verification data are displayed.

Though the present embodiment has been explained in conjunction with the adjustment of a membership function in a fuzzy inference taken as one example. However, the present invention is applicable to the learning in a neural network and so on. Though the square sum of errors is used upon evaluation as it is, the square sum may be weighted.

Next, an embodiment concerning the learning of a fuzzy knowledge will be explained as another embodiment of the present invention by use of FIGS. 6 to 17.

The present embodiment is explained in conjunction with an example in which the object of learning for membership functions is interactively designated. In an example of a fuzzy knowledge used in the present embodiment, the movement or trend of a stock price is estimated from the previous data. This fuzzy knowledge has four rules as follows:

1. if (the average line is ascending and the degree of disparity is underlying), then (the forecast is a rise) 1.0;
2. if (the average line is descending and the degree of disparity is overlying), then (the forecast is a fall) 1.0;
3. if (the average line is ascending and the degree of disparity is a little overlying), then (the forecast is a little rise) 1.0; and
4. if (the average line is descending and the degree of disparity is a little underlying), then (the forecast is a little fall) 1.0.

The "average line" represents the average of final values of a stock price over previous several days, the "degree of disparity" represents the degree of disparity of the stock price from the average line, and the "forecast" represents the trend of the stock price. The meaning of each proposition is defined by a membership function. A numeric value described at the last of the "then" portion of each rule shows the weighting of that rule.

Figure 6:
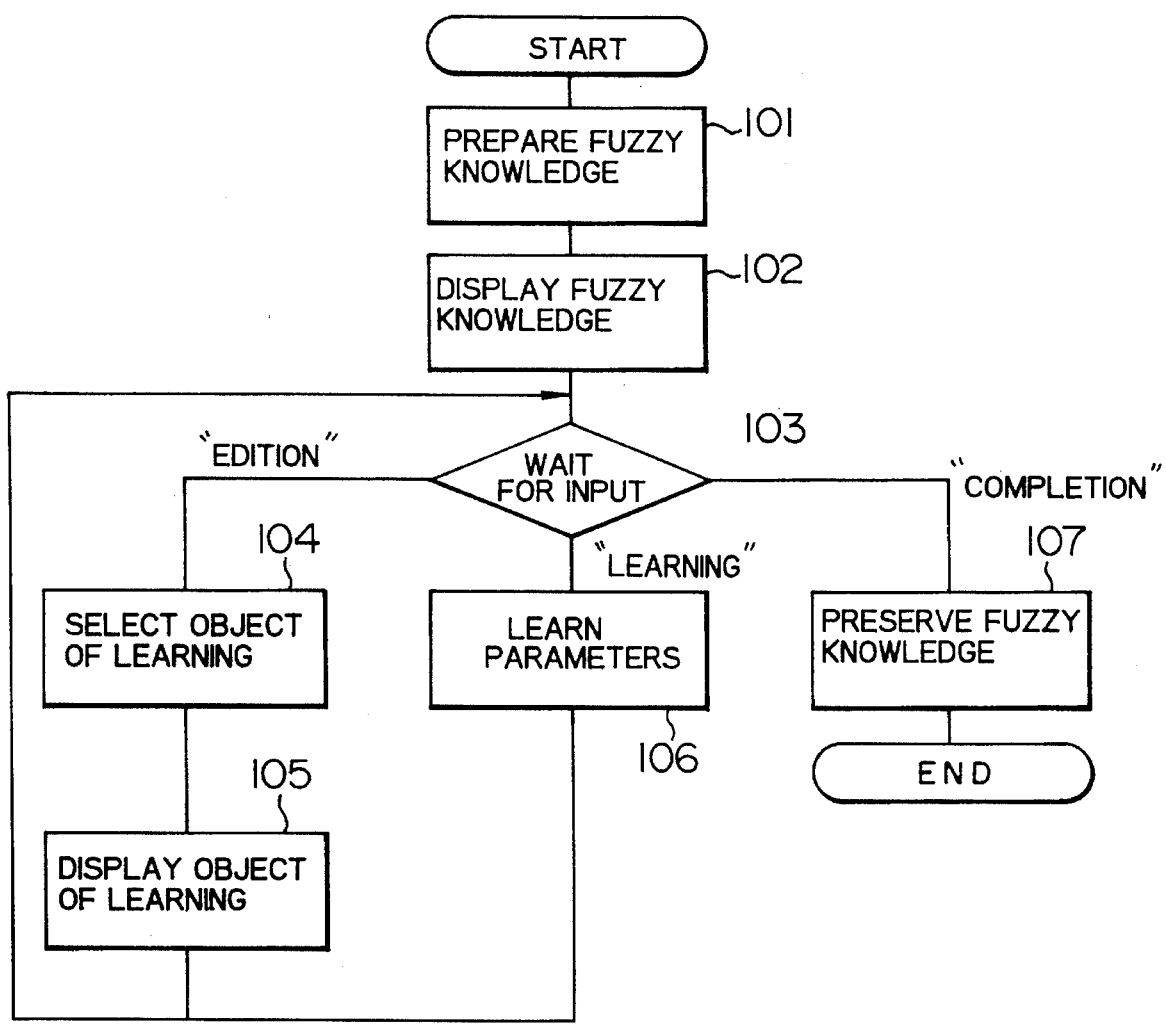
FIG. 6 is a flow chart showing a procedure in another embodiment of the present invention.

FIG. 6 is a flow chart showing a procedure in an embodiment of a method of designating the range of learning of a fuzzy knowledge. In FIG. 6, reference numerals 101 to 107 denote respective processing steps.

Figure 7:
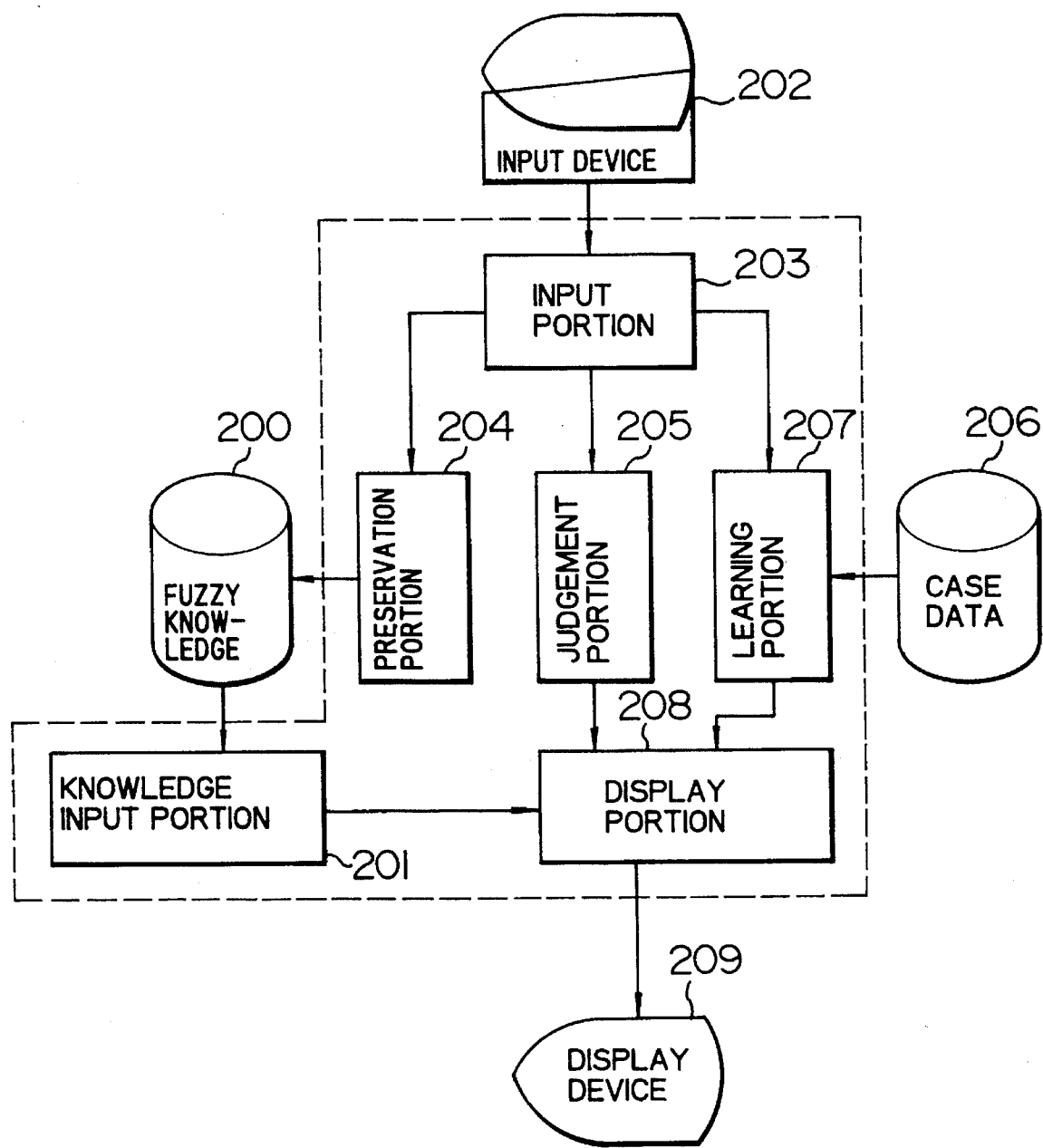
FIG. 7 is a block diagram showing the construction of a learning apparatus for realizing the other embodiment of the present invention.

FIG. 7 is a block diagram showing the general construction of an embodiment for realizing a learning method or apparatus of the present invention. In FIG. 7, rules each having an if-then form and membership functions defining the meaning of propositions used in the rules are preserved in a fuzzy knowledge 200. The four rules mentioned above are preserved in the fuzzy knowledge 200. The contents of the fuzzy knowledge 200 are read by a knowledge input portion 201. A range of learning or the like is designated by a user through an input device 202. An input portion 203 reads the contents of the input device 202 and judges the kind of the designation. A preservation portion 204 writes the contents of a rule and membership functions at that point of time into the fuzzy knowledge 200. A judgement portion 205 makes the judgement as to whether or not each proposition is the object of learning. Possible states of the object of application of the fuzzy knowledge 200 and teacher data (or teacher data) related thereto are stored in case data 206. A membership function of a proposition judged by the judgement portion 205 as being the object of learning is changed by a learning portion 207 by use of the case data 206. A display portion 208 edits a rule inputted from the knowledge input portion 201, the object of learning judged by the judgement portion 205 and information of a membership function changed by the learning portion 207 and outputs the edited contents to a display device 209.

FIG. 8A is a diagram showing a list of propositions, a learning flag table LFLAG and an edit flag table EFLAG, and FIG. 8B shows a list of rules in the fuzzy knowledge 200.

In FIG. 8A, reference numeral 301 denotes a registered list of propositions used in all rules which are used in the present embodiment. The proposition list 301 includes a plurality of sets each of which is composed of a proposition No. (number), a subject and a predicate and which are prepared by the number $P_{max}$ of propositions used in the rules. Numeral 303 denotes a learning flag table which includes for each proposition in the proposition list 301 a learning flag $LFLAG_p$ which indicates whether or not that proposition is the object of learning. The proposition is specified by a subscript p. For example, a learning flag $LFLAG_1$ indicates whether or not a proposition having the proposition number of "1" is the object of learning, and a learning flag $LFLAG_2$ indicates whether or not a proposition having the proposition number of "2" is the object of learning. The subscript p can take a value in a range between 1 and the number of $P_{max}$ of propositions. The learning flag $LFLAG_p$ takes a value of "1" if the corresponding proposition is the object of learning and a value of "0" if it is out of the object of learning. Numeral 304 denotes an edit flag table which includes for each proposition in the proposition list 301 an edit flag $EFLAG_p$ which indicates whether or not that proposition is designated as the object of edition. The proposition is specified by a subscript p. The subscript p can take a value in a range between 1 and the number $P_{max}$ of propositions. The edit flag $EFLAG_p$ takes a value of "1" if the corresponding proposition is designated as the object of edition and a value of "0" if it is not designated as the object of edition.

In FIG. 8B, reference numeral 302 denotes a rule list which shows the contents of all rules used in the present embodiment. Data corresponding to the respective rules are described in the rule list 302 by the number $R_{max}$ of rules. Each data is composed of the rule number of each rule and the contents of that rule. The contents of each rule are divided into an "if" portion and a "then" portion. In each "if" or "then" portion are described the number of propositions which form that portion and the proposition number $PR_{ri}$ of each proposition which belongs to that portion. The proposition number $PR_{ri}$ is designated by the proposition number of a proposition which coincides with the combination of a subject and a predicate in the proposition list 301.

When the rule number for specifying a rule is represented by r (r=1 to the number $R_{max}$ of rules), the number of propositions of the "if" portion of that rule is represented by $NI_r$. Similarly, the number of propositions of the "then" portion is represented by $NT_r$. The subscript r of the proposition number $PR_{ri}$ indicates a rule No. and the subscript i thereof indicates a storage position. The subscript i takes a value in a range between 1 and the number $NI_r$ of propositions of the "if" portion or the number $NT_r$ of propositions of the "then" portion. For example, in the case where the rule number r is "1, "the number $NI_1$ of propositions of the "if" portion is "2", the proposition number $PR_{11}$ is "1" and $PR_{12}$ is "2", it is meant that the "if" portion of the 1st rule is formed of two propositions including the proposition of No. 1 "the average line is ascending" and the proposition of No. 2 "the degree of disparity is underlying".

Figure 9:
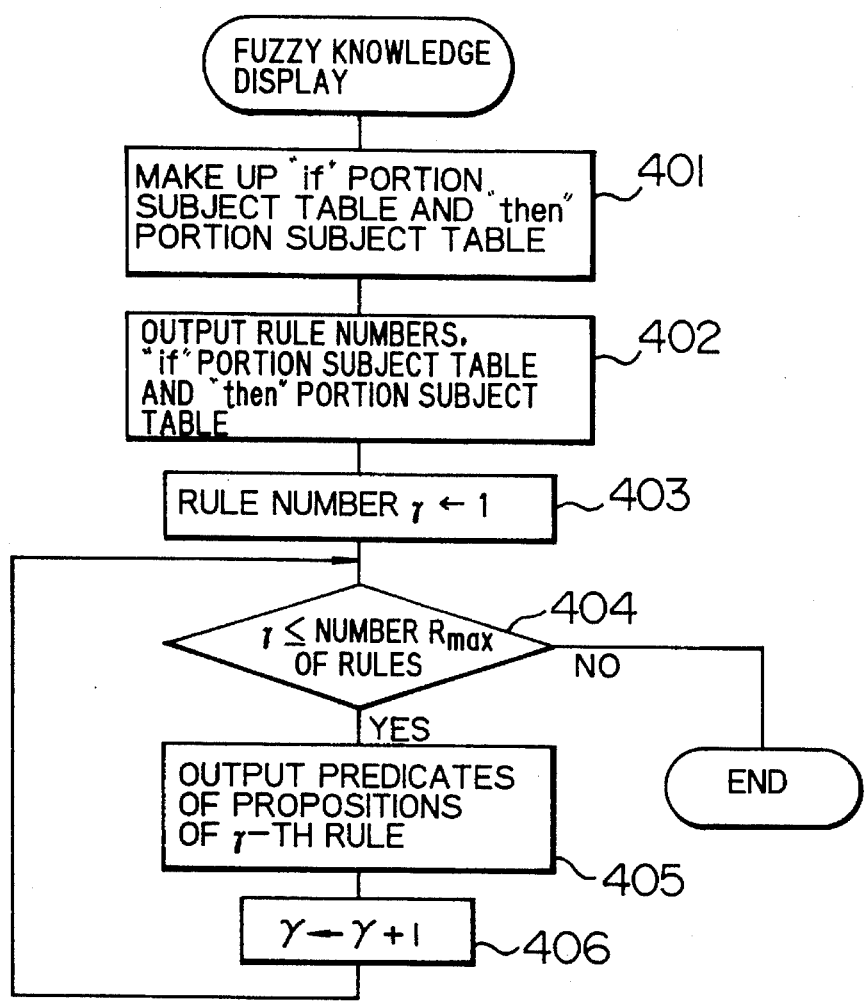
FIG. 9 is a flow chart showing the details of a fuzzy knowledge display processing in the procedure shown in FIG. 6.

FIG. 9 is a flow chart showing the details of a fuzzy knowledge display processing (step 102 in FIG. 6) in a procedure in the present embodiment. In FIG. 9, reference numerals 401 to 406 denotes respective processing steps.

Figure 10:
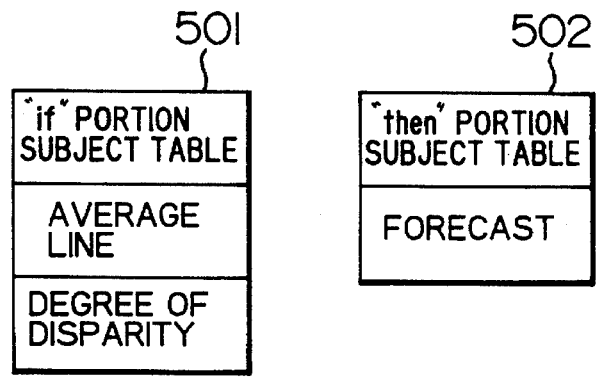
FIG. 10 is a conceptual diagram showing the construction of an "if" portion subject table and a "then" portion subject table in the other embodiment of the present invention.

FIG. 10 shows the construction of an "if" portion subject table 501 for storing all the subjects of propositions used in the "if" portions of the rules and the construction of a "then" portion subject table 502 for storing all the subjects of propositions used in the "then" portions of the rules.

Figure 11:
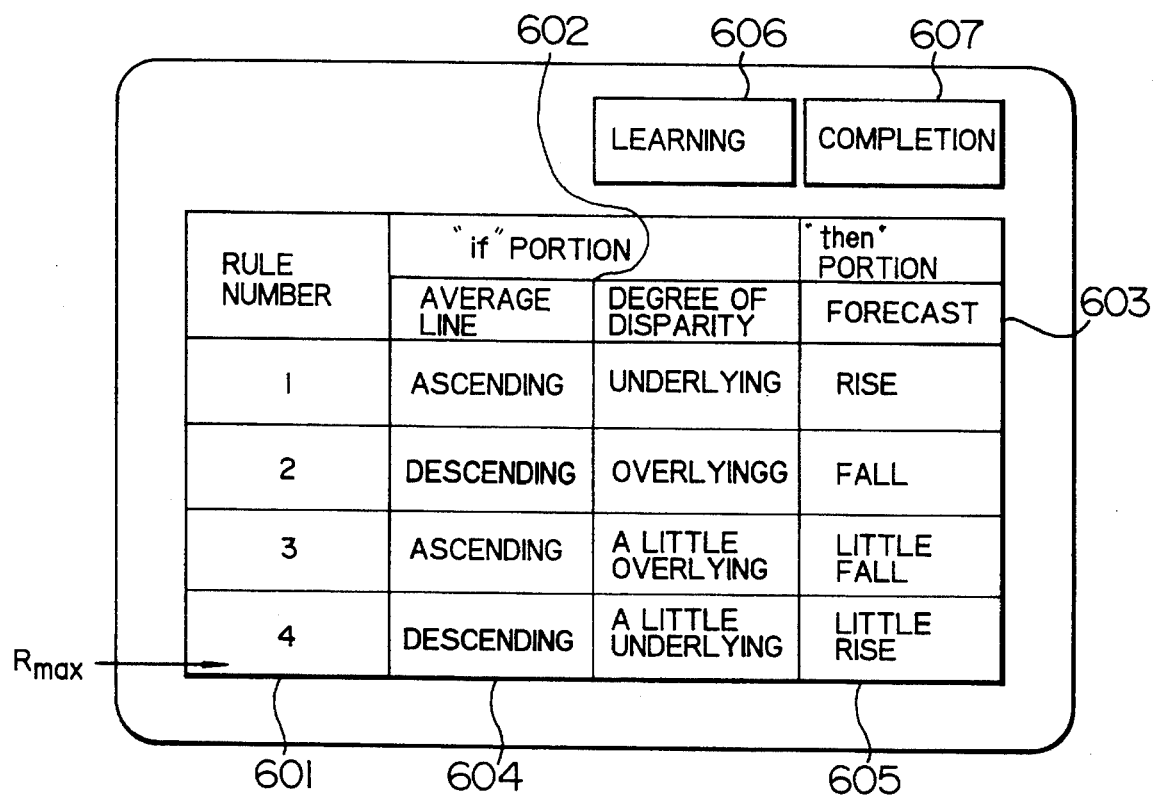
FIG. 11 shows an example of an output as displayed on a display device in the other embodiment of the present invention.

FIG. 11 shows an example of rules as outputted to or displayed on the display device 209. In FIG. 11, reference numeral 601 denotes a rule number region, numeral 602 an "if" portion subject region, numeral 603 a "then" portion subject region, numeral 604 an "if" portion predicate region, numeral 605 a "then" portion predicate region, numeral 606 a learning region, and numeral 607 a completion region.

Figure 12:
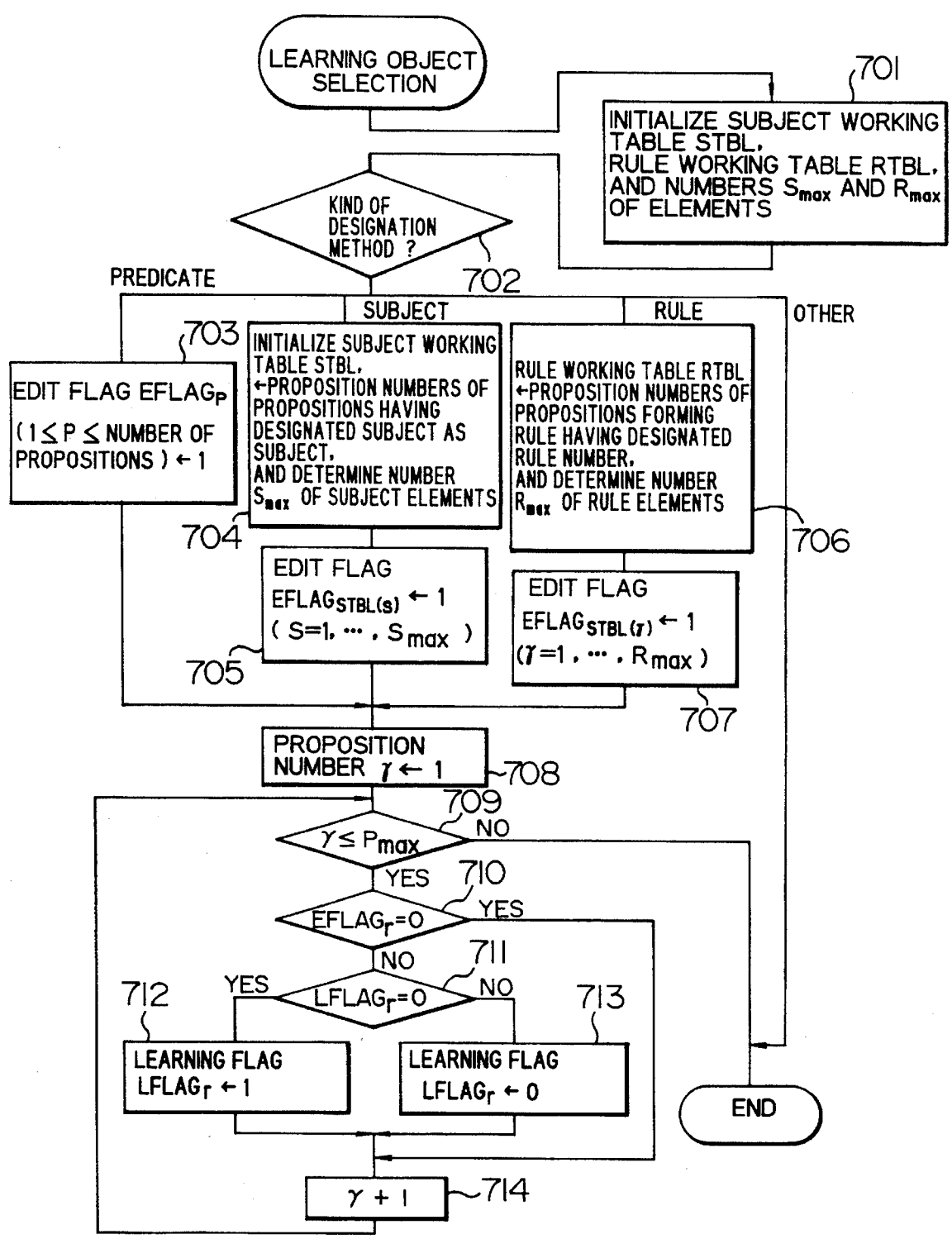
FIG. 12 is a flow chart showing the details of a learning proposition selection processing in the procedure shown in FIG. 6.

FIG. 12 is a flow chart showing the details of a learning object selection processing (step 104 in FIG. 6) in the procedure in the present embodiment. In FIG. 12, reference numerals 701 to 713 denote respective processing steps.

FIG. 13 shows the construction of a subject working table STBL and the construction of a rule working table RTBL. In FIG. 13, reference numeral 801 denotes the subject working table STBL used when a method for designation of a proposition to be learned is "SUBJECT". In the subject working table STBL are preserved the proposition Nos. (numbers) of propositions which have the designated name as a subject. Numeral 802 denotes the rule working table RTBL used when the edit proposition designating method is "RULE". In the rule working table RTBL are preserved the proposition numbers of propositions which are used in the designated rule. Each of the subject working table STBL and the rule working table RTBL ensures an area in which the proposition numbers can be preserved up to the maximum number $P_{max}$ of propositions.

Figure 14:
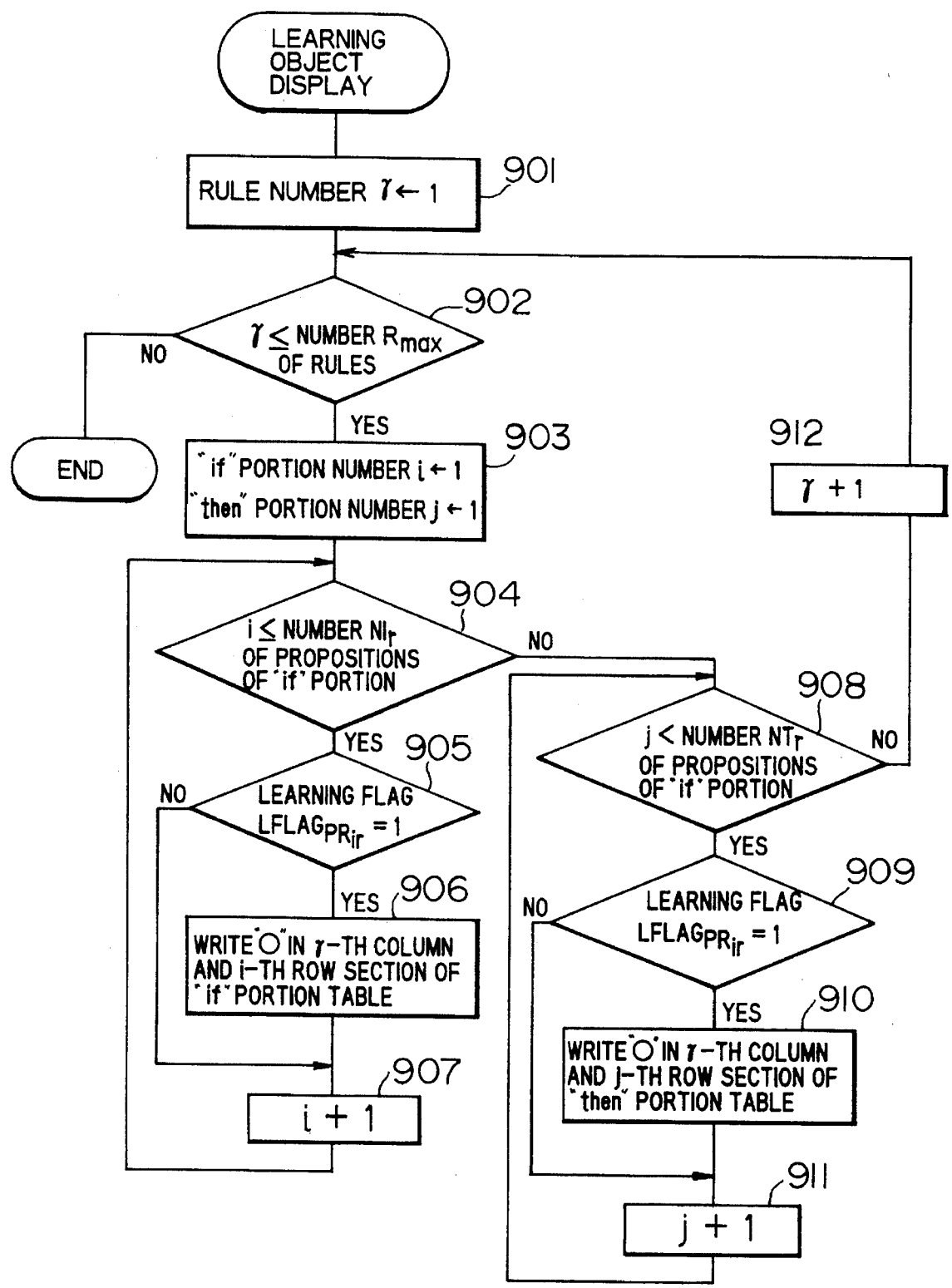
FIG. 14 is a flow chart showing the details of a learning object display processing in the procedure shown in FIG. 6.

FIG. 14 is a flow chart showing the details of a learning object display processing (step 105 in FIG. 6) in the procedure in the present embodiment. In FIG. 14, reference numerals 901 to 912 denotes respective processing steps.

FIG. 15 shows an example of an output as displayed in the case where the object of learning is designated in units of a predicate. In FIG. 15, a proposition marked with "○" is the object of learning.

FIG. 16 shows an example of an output as displayed in the case where the object of learning is designated in units of a subject. In FIG. 16, a proposition marked with "○" is the object of learning.

FIG. 17 shows an example of an output as displayed in the case where the object of learning is designated in units of a rule. In FIG. 17, a proposition marked with "○" is the object of learning.

Next, the operation of the present embodiment will be explained using FIGS. 6 to 17.

Referring to FIGS. 6 and 7, when the system of the present embodiment starts its operation, the knowledge input portion 201 reads the fuzzy knowledge 200 and initializes the learning flag table and the edit flag table by setting all of the learning flags $LFLAG_p$ and the edit flags $EFLAG_p$ (p=1 to the number $P_{max}$ of propositions) to "0" (step 101). Also, the knowledge input portion 201 makes up a proposition list 301 and a rule list 302 as shown in FIGS. 8A and 8B on the basis of the read fuzzy knowledge 200. In the present embodiment, the four rules as mentioned above are read as the fuzzy knowledge 200 to make up the proposition list 301 concretely shown in FIG. 8A including sets each composed of a proposition number, a subject and a predicate and the rule list 302 concretely shown in FIG. 8B.

Next, the display portion 208 outputs rules in the fuzzy knowledge to the display device 209 (step 102). The details of this processing are shown in FIG. 9.

First, the "if" portion subject table 501 and the "then" portion subject table 502 are made up on the basis of the subject list table 301 and the rule list table 302 (step 401). Namely, subjects of propositions having the proposition numbers $PR_{ri}$ (r=1 to the number $R_{max}$ of rules and i=1 to the number $NI_r$ of propositions of each "if" portion) of the "if" portions in the rule list 302 are successively copied into the "if" portion subject table 501. However, in the case where the same subject name has already existed in the "if" portion subject table 501, that name is not copied. Similarly, the "then" portion subject table 502 is made up. For example, in the case of the four rules mentioned above, two subjects of "average line" and "degree of disparity" are written into the "if" portion subject table 501 and one subject of "forecast" is written into the "then" portion subject table 502.

Next, the contents of the "if" portion subject table 501 and the contents of the "then" portion subject table 502 are successively outputted to the "if" portion subject region 602 and the "then" portion subject region 603 of the display device 209, respectively and the numbers of 1 to the number $R_{max}$ of rules are successively outputted to the rule number region 601 (step 402). Thereafter, the rule number r is set to 1 (step 403), and the rule number r and the number $R_{max}$ of rules are compared (step 404).

If the rule number r is not larger than the number $R_{max}$ of rules, the display portion 8 determines the output locations for propositions of the r-th rule and displays the predicates of those propositions at the corresponding locations of the "if" portion predicate region 604 and the "then" portion predicate region 605 (step 405). And, the rule number r is incremented by +1 (step 406) and the flow returns to step 404. If the rule number r exceeds the number $R_{max}$ of rules, the fuzzy knowledge display processing is completed.

For example, the 2nd rule includes the proposition numbers "4", "5" and "6". Then, the output location for each proposition number is examined to display the predicate of the corresponding proposition. Since "the degree of disparity is overlying" of the proposition number "5" is used in the "if" portion and the "degree of disparity" of the subject is preserved at the 2 nd of the "if" portion subject table, the display portion 208 outputs the predicate "overlying" to the 2nd-column and 2nd-row section of the "if" portion predicate region 604, as shown in FIG. 11.

After the fuzzy knowledge has been displayed, the input portion 203 waits for the designation of some location on the display device 209 by a user using the input device 202 (step 103). When the user designates any one of the rule number region 601, the "if" portion subject region 602, the "then" portion subject region 603, the "if" portion predicate region 604 and the "then" portion predicate region 605, the judgement as being "EDITION" is made and the flow branches to step 104 in order to make edition for a range of the object of learning. Namely, first, the judgement portion 205 makes the selection of a proposition to be learned on the basis of a designated range (step 104). The details of this learning object selection processing are shown in FIG. 12.

Referring to FIG. 12, in a first step 701 of the learning object selection processing, "0" is set to each element of each of a subject working table $STBL_i$ (i=1 to the number $P_{max}$ of propositions) 801 and a rule working table $RTBL_i$ (i=1 to the number $P_{max}$ of propositions) 802 used here, the number $S_{max}$ of subject elements and the number $R_{max}$ of rule elements. Next, in step 702, a method for designation of a proposition to be edited is judged on the basis of the location designated in step 103.

In the case where the designated location is the "if" portion predicate region 604 or the "then" portion predicate region 605, the designation method is judged as being "PREDICATE" and the flow branches to step 703. A proposition corresponding to the designated portion is taken as a proposition to be edited and an edit flag EFLAG ($1 \leq p \leq$ the number $P_{max}$ of propositions) 304 corresponding to that proposition is set to "1" (step 703). For example, when the user designates the 3rd-column and 2nd-row section of the "if" portion predicate region 604, a proposition to be edited is "the degree of disparity is a little overlying" or corresponds to the seventh proposition of the proposition list 301 and hence the seventh edit flag $EFLAG_7$ is set to "1". After step 703, the flow proceeds to step 708.

In the case where the "if" portion subject region 602 or the "then" portion subject region 603 is designated, the designation method is judged as being "SUBJECT" and the flow branches to step 704. The proposition numbers in the proposition list 301 for propositions having the same subject as a subject name designated by the user are successively stored into the subject working table STBL 801 and the number of proposition numbers stored in the table is set as the number $S_{max}$ of subject elements (step 704). For example, when "degree of disparity" of the "if" portion subject region 602 is designated, the proposition numbers "2", "5", "7" and "9" of propositions having "degree of disparity" as a subject are set into the subject working table STBL 801, as shown in FIG. 13, and the number $S_{max}$ of subject elements is set to 4.

Then, as for each proposition number in the subject working table $STBL_i$ (i=1 to the number $S_{max}$ of subject elements), the corresponding edit flag $EFLAG_{p\ (p=STBLi)}$ and i= the number $S_{max}$ of subject elements) is set to "1" (step 705). For example, when the contents of the subject working table $STBL_i$ (i=1 to the number $S_{max}$ of subject elements) are as shown in FIG. 13, the edit flags $EFLAG_{p\ (p=1}$ to the number $P_{max}$ of propositions) are set as shown in the edit flag table 304 of FIG. 8. After step 705, the flow proceeds to step 708.

In the case where the rule number region 601 is designated by the user, the designation method is judged as being "RULE" and the flow branches to step 706. The proposition numbers in the rule list 302 for propositions used in a rule having a rule number designated by the user are successively stored into the rule working table RTBL 802 and the number of proposition numbers stored in the table is set as the number $R_{max}$ of rule elements (step 706). For example, when a rule number "3" is designated, it is known from information in the rule list 302 that the proposition numbers of propositions forming a rule having the rule number "3" are "1", "7" and "8". Therefore, the rule working table RTBL 802 is set as shown in FIG. 13 and the number $R_{max}$ of rule elements is set to 3.

Then, as for each proposition number in the rule working table $RTBL_i$ (i=1 to the number $R_{max}$ of rule elements), the corresponding edit flag $EFLAG_p$ (p= $RTBL_i$ and i= the number $R_{max}$ of rule elements) is set to "1"(step 707). After step 707, the flow proceeds to step 708.

In step 708, the proposition number "1" is set into a working register r. The proposition number r and the number $P_{max}$ of propositions are compared in step 709. If the proposition number r is equal to or smaller than the number $P_{max}$ of propositions, the examination is made as to whether or not the edit flag $EFLAG_r$ is "0" (step 710). When the edit flag $EFLAG_r$ is "0", it is meant that the corresponding proposition is not designated. Therefore, the flow branches to step 714 in order to perform a processing for the next proposition.

On the other hand, when the edit flag $EFLAG_r$ is "1" (step 710), the judgement is made as to whether or not the learning flag $LFLAG_r$ is "0" (step 711). In the case where the learning flag $LFLAG_r$ is "0" the learning flag $LFLAG_r$ is turned to "1" (step 712). In the case where the learning flag $LFLAG_r$ is "1" the learning flag $LFLAG_r$ is turned to "0" (step 713). After step 712 or 713, the flow proceeds to step 714 to increment the proposition number r by +1 and then returns to step 709.

When the kind of the designation method is neither "PREDICATE", "SUBJECT" nor "RULE" (step 702) or when the proposition number r is larger than the number $P_{max}$ (step 709), the learning object selection processing is completed.

After the object of learning has been selected, the display portion 208 outputs the present object of learning to the display device 209 (step 105 of FIG. 6). In this learning object display step, a proposition, which is the object of learning, is marked with a symbol "○". The detailed procedure for the learning object display step are shown in FIG. 14.

Referring to FIG. 14, in the first step 901 of the learning object display processing, the rule number r is set to "1". In step 902, the rule number r and the number $R_{max}$ of rules are compared. If the rule number r is equal to or smaller than the number $R_{max}$ of rules, an "if" portion number i and a "then" portion number j are set to "1" (step 903), and the "if" portion number i and the number $NI_r$ of propositions of the "if" portion are compared (step 904). If the "if" portion number i is equal to or smaller than the number $NI_r$ of propositions of the "if" portion, the examination is made as to whether or not the learning flag $LFLAG_k$ (k= the proposition number $PR_{ri}$) for the proposition number $PR_{ri}$ of the i-th "if" portion of the r-th rule is "1" (step 905). In the case where the learning flag $LFLAG_k$ is "1", "○" is written in the r-th column and i-th row section of the "if" portion table (step 906). And, the "if" portion number i is incremented by +1 in step 907 and the flow returns to step 904. On the other hand, in the case where the learning flag $LFLAG_k$ is not "1" (step 905), the flow branches to step 907.

If the "if" portion number i is larger than the number $NI_r$ of propositions of the "if" portion (step 904), the "then" portion number j and the number $NT_r$ of propositions of the "then" portion are compared (step 908). If the "then" portion number j is equal to or smaller than the number $NT_r$ of propositions of the "then" portion, the examination is made as to whether or not the learning flag $LFLAG_k$ (k= the proposition number $PR_{rj}$) for the proposition number PR of the j-th "then" portion of the r-th rule is "1" (step 909). In the case where the learning flag $LFLAG_k$ is "1", "○" is written in the r-th column and j-th row section of the "then" portion table (step 910). And, the "then" portion number j is incremented by +1 in step 911 and the flow returns to step 908. On the other hand, in the case where the learning flag $LFLAG_k$ is not "1" (step 909), the flow branches to step 911.

When the "then" portion number j is larger than the number $NT_r$ of propositions of the "then" portion (step 908), the rule number r is incremented by +1 in step 912 and the flow returns to step 902. When the rule number r exceeds the number $R_{max}$ of rules (step 902), the learning object display processing is completed and the flow returns to step 103 (see FIG. 6).

FIG. 15 shows an example of an output as displayed in the case where the user designates the object of edition in units of a predicate, or more particularly, the user designates "the average line is ascending" in the 1st-column and 1st-row section or the 3rd-column and 1st-row section of the "if" portion predicate region 604. A symbol "○" denotes the object of learning. Since the 1st and 3rd rules hold "the average line is ascending" in common, "○" is provided at two locations.

Similarly, FIG. 16 shows an example of an output as displayed in the case where the user designates the object of edition in units of a subject, or more particularly, the user designates "degree of disparity" in the 2nd row of the "if" portion subject region 602. A symbol "○" denotes the object of learning. Each proposition in the 2nd row of the "if" portion predicate region 604 having "degree of disparity" as a subject is marked with "0".

Also, FIG. 17 shows an example of an output as displayed in the case where the user designates the object of edition in units of a rule, or more particularly, the user designates the 3rd row of the rule number region 601. A symbol "○" denotes the object of learning. Since "the average line is ascending" of the 3rd rule is also used by the 1st rule, "○" is provided in the "if" portion predicate region 604 to the predicate "ascending" in the 1st-column and 1st-row section in addition to each proposition of the 3rd rule.

When the user designates the learning region 606 in step 103, the judgement as being "LEARNING" is made and the flow branches to step 106. In step 106, the learning portion 207 learns a membership function of a proposition corresponding to one of elements of the learning flag table 303 having a learning flag $LFLAG_p$ (p=1 to the number $P_{max}$ of propositions) and thereafter outputs the result of learning to the display device 209. And, the flow returns to step 103 again.

When the user designates the completion region 607 in step 103, the judgement as being "COMPLETION" is made and the flow branches to step 107. The membership function at the present point of time is preserved into the fuzzy knowledge (step 107), thereby completing the entire processing.

According to the present embodiment, the selection of the object of learning and the execution of a learning for the selected object of learning can be made in a simple operation. Therefore, it is possible to perform a learning with the user's intention reflected, thereby improving the fuzzy knowledge structuring efficiency.

Next, explanation will be made of a further embodiment of the present invention in which a fuzzy knowledge and the object of learning are edited. The construction and procedure of this embodiment are similar to those of the foregoing embodiment explained in conjunction with FIGS. 6 to 14. In this embodiment, however, the input device 202 shown in FIG. 7 has a mouse having two buttons (or a first button and a second button) and a keyboard. Also, the processing of steps 104 and 105 in FIG. 6 or a branch of step 103 is replaced by a processing shown in FIG. 18.

The operation of the present embodiment will now be explained in detail by use of FIGS. 6 and 18.

Similarly to the foregoing embodiment, a fuzzy knowledge is prepared (step 101) and is displayed (step 102) and thereafter the input portion 203 waits for the designation of some location of the display device 209 by a user using the input device 202 (step 103). In the case where the user designates the learning region 606 or the completion region 607 by use of the mouse of the input device 209 in step 103, a processing similar to that in the foregoing embodiment is performed.

In the case where the user designates the rule number region 601, the "if" portion subject region 602, the "then" portion subject region 603, the "if" portion predicate region 604 or the "then" portion predicate region 605 by use of the mouse of the input device 209 in step 103, the fuzzy knowledge and the object of learning are edited. The details of this processing are shown in FIG. 18.

Figure 18:
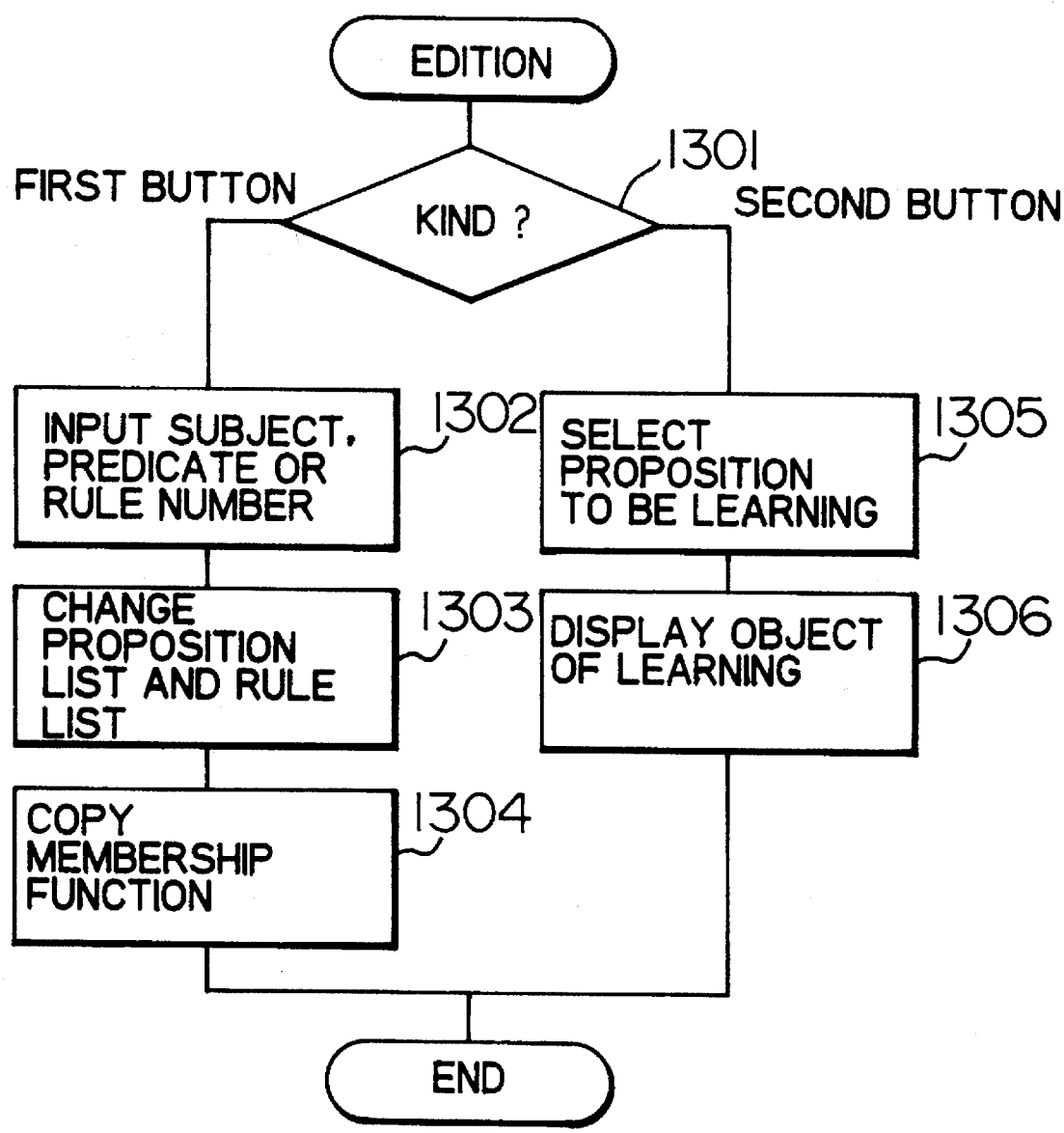
FIG. 18 is a flow chart showing the details of a processing for edition of a fuzzy knowledge and the object of learning object in a procedure in a further embodiment of the present invention.

Referring to FIG. 18, the examination is made as to whether the button of the mouse of the input device 209 used by the user in step 103 is the first button or the second button (step 1301). In the case where the used button is the first button, the judgement as being the edition of the fuzzy knowledge is made and the flow branches to step 1302. And, a wait is taken for the inputting of a new name by the user into the location designated. Namely, if the user designates a rule number region (through a pointing by the mouse), the user can input a new rule number. If the user designates the subject or predicate region, the user can input a new name (step 1302).

Next, a change is made for the proposition list 301 and the rule list 302 on the basis of the inputted contents (step 1303). Namely, if the inputted contents are a rule number, the contents of the rule list 302 are interchanged. If the inputted contents are a subject, the subject name of the corresponding portion of the proposition list 301 is changed. If the inputted contents are a predicate, a proposition composed of the inputted predicate name and a subject corresponding to the designated portion is newly produced and is set at the last of the proposition list.

In the case where the inputted contents in step 1302 are the predicate name, the membership function of a proposition corresponding to the location designated in step 103 is copied for a membership function of the new proposition in order to define the meaning of the new proposition (step 1304). Thereafter, the flow returns to step 103.

In the case where the used button is the second button (step 1302), the judgement as being the edition of the object of learning is made and the flow branches to step 1305. Then, a proposition to be learned is selected (step 1305) and the object of learning is displayed (step 1306). And, the flow returns to step 103. The details of processings in steps 1305 and 1306 are similar to those in steps 104 and 105 shown in FIG. 8.

According to the present embodiment, it is possible to make not only a learning with the designation of the object of learning but also the edition of a fuzzy knowledge itself. Accordingly, even in the case where a user desires to change or add a fuzzy knowledge after the learning has been made with the designation of the object of learning, it is possible to simply perform a processing required therefor.

Next, a still further embodiment of the present invention in which the learning of a fuzzy knowledge, especially, the weighting of a rule is included. The construction and the procedure of this embodiment are similar to those of the embodiment explained in conjunction with FIGS. 6 to 14. In the present embodiment, however, the processing of step 104 in FIG. 6 is replaced by a processing shown in FIG. 19 and the example of an output as displayed is replaced by that shown in FIG. 20.

Figure 19:
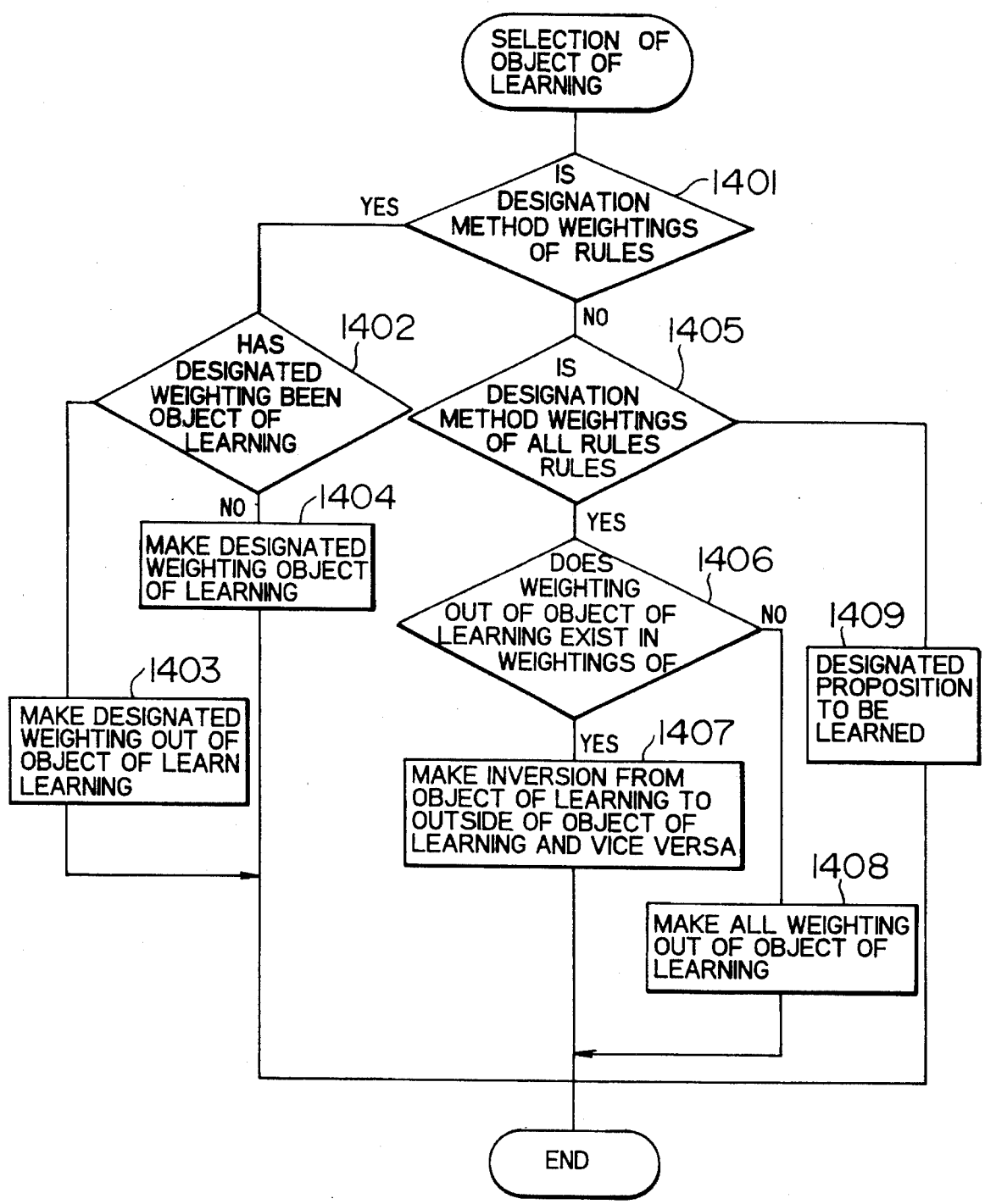
FIG. 19 is a flow chart showing the details of a processing for selection of the object of learning inclusive of the weighting of a rule in a procedure in a still further embodiment of the present invention.

FIG. 19 is a flow chart showing the detailed procedure for the learning object selecting step 104 of the procedure in the present embodiment. In FIG. 19, reference numerals 1401 to 1409 denote respective processing steps.

Figure 20:
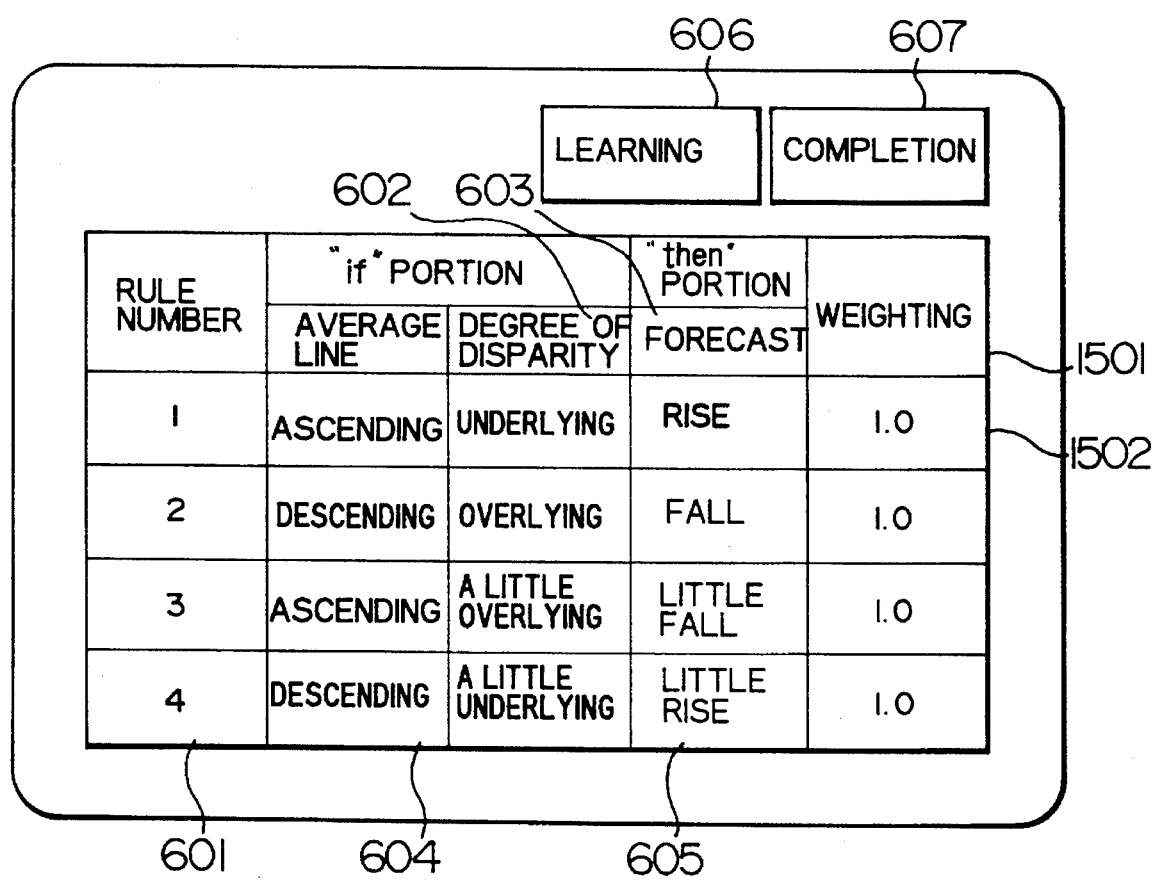
FIG. 20 shows an example of an output as displayed in the still further embodiment of the present invention.

FIG. 20 shows an example of the display of rules and weightings outputted to the display device 209 in accordance with the present embodiment. In FIG. 20, reference numeral 1501 denotes an all-weighting region for designating whether or not the weightings of all rules should be made the object of learning, and numeral 1502 denotes a weighting region for displaying the weighting of each rule and designating whether or not the weighting should be made the object of learning. Other reference numerals used in FIG. 20 are the same as the numerals used in FIG. 11.

The operation of the present embodiment will now be explained in detail by use of FIGS. 6, 19 and 20.

Similarly to the foregoing embodiment, a fuzzy knowledge is prepared (step 101) and is displayed (step 102). An output as displayed in step 102 is as shown in FIG. 20. A table shown in FIG. 20 is one in which a row for outputting the weighting of each rule with the weighting being taken as an item name (that is, the all-weighting region 1501 and the weighting region 1502) is added to the table of FIG. 11 on the rightmost side thereof. A procedure for display is basically the same as that shown in FIG. 9. However, in outputting the predicate of a proposition in step 405, the weighting of the corresponding r-th rule is outputted to the display device 209.

Next, the input portion 203 waits for the designation of any one of the regions of the display device 209 by a user using the input device 202 (step 103). In the case where the user designates any one of the rule number region 601, the "if" portion subject region 602, the "then" portion subject region 603, the "if" portion predicate region 604, the "then" portion predicate region 605, the all-weighting region 1501 and the weighting region 1502 in step 103, the judgement as being "EDITION" is made and the flow branches to step 104 in order to make edition for a range of the object of learning.

Referring to FIG. 19, the judgement is made as to whether or not the weighting region 1502 is designated (step 1401). In the case where the weighting region 1502 is designated, the examination is made as to whether or not the designated weighting has already been the object of learning (step 1402). If the designated weighting has already been the object of learning, the weighting is made out of the object of learning (step 1403). If the designated weighting has not yet been the object of learning, the weighting is made the object of learning (step 1404). After step 1403 or 1404, the flow proceeds to step 105.

In the case where the weighting region 1502 is not designated (step 1401), the judgement is made as to whether or not the all-weighting region 1501 is designated (step 1405). When the all-weighting region 1501 is designated, the judgement is made as to whether or not any weighting out of the object of learning is included in the weightings of all rules (step 1406). If any weighting out of the object of learning is included, the inversion from the object of learning to the outside of the object of learning or vice versa is made for the weighting of each rule (step 1407). Namely, a weighting, which has already been the object of learning, is made out of the object of learning, and a weighting, which has not yet been the object of learning, is made the object of learning. When the weightings of all rules have already been the object of learning (step 1406), they are all made out of the object of learning. After step 1407 or 1408, the flow returns to step 105.

In the case where the all-weighting region 1501 is not selected by the user (step 1405), the processing shown in FIG. 12 is performed under the judgement as being the selection of a proposition (step 1409) and the flow returns to step 105. When the user designates the rule number region 601 in step 103, a proposition number in a designated rule is preserved into the rule working table 802 in step 706 in order to manage the proposition numbers. At this time, the weightings of the rules are also managed by preparing a table concerning the weightings of rules which are made the object of learning. A processing in and after step 105 is similar to that in the foregoing embodiment.

According to the present embodiment, it is possible to designate even the weighting of a rule as the object of learning to make a learning for the designated weighting.

As apparent from the foregoing explanation, the present invention provides the following effects.

(1) Since a user can visually confirm the state of an overlearning and parameters to be learned at the point of time before the occurrence of the overlearning are automatically preserved, it becomes unnecessary for the user to repeat the learning. Also, since the learning can be stopped while observing a display screen on which an error for teacher data and an error for verification data are simultaneously displayed, it becomes possible to preserve parameters to be learned at the point of time when the automatic saving is not made and hence it is possible to grasp the state of learning at the number of times of learning at that point of time. As a result, the man-machine interface can be improved and the overlearning can be prevented.

(2) Since a user can arbitrarily designate the object of learning for a fuzzy knowledge, it becomes possible to reflect the user's intention in the learning of a proposition, thereby improving the fuzzy knowledge structuring efficiency. Since rules are outputted to a display device in the form of a table, the missing or doubling of a rule can easily be detected and the user can easily grasp the structure of a fuzzy knowledge. Also, since the user designates the object of learning, for example, while seeing rules displayed on the display device, it is possible to interactively make the learning of a rule. Since the object of learning can be selected not only in units of a proposition but also in units of a subject, a rule or the like, a good operability can be attained. An input device can make not only the designation of the object of learning but also the direct change of a fuzzy knowledge. Therefore, it becomes possible to flexibly cope with the state of learning of a fuzzy knowledge. For example, a proposition held in common by a plurality of rules can easily be divided.

We claim:

1. A method for preventing overlearning of a model in which a plurality of teacher data is comprised of a plurality of training data each including a pair of a training input value and a training output value and further comprised of a plurality of verification data each including a pair of a verification input value and a verification output value, and wherein learning of said model is performed by repeating a step of receiving a training input value and a step of adjusting a calculation method in said model so that a training output value obtained by the calculation method on the basis of said received training input value approaches to a training output value in each of said training data, said method comprising the steps of:

first calculating a first error between the training output value obtained by performing the calculation method in said model on the basis of a received training input value and the training output value;

second calculating a second error between a verification output value obtained by performing an adjusted calculation method in said model on the basis of a verification input and the verification output value;

concurrently displaying said first and second errors on display means;

repeating said first and second calculating steps and said display step as a learning process of the model until a comparison of said first and second errors indicates an overlearning of the model; and stopping said repeating steps in response to a user's instruction based on said displayed errors.

2. A method for preventing overlearning of a model in which a plurality of teacher data is comprised of a plurality of training data each including a pair of a training input value and a training output value and further comprised of a pair of a verification input value and a verification output value, and wherein learning of said model is performed by repeating a step of receiving a training input value and a step of adjusting a calculation method in said model so that a training output value obtained by the calculation method on the basis of said received training input value approaches to a training output value in each of said training data, said method comprising the steps of:

first calculating a first error between the training output value obtained by performing the calculation method in said model on the basis of a received training input value and the training output value;

second calculating a second error between a verification output value obtained by performing an adjusted calculation method in said model on the basis of a verification input and the verification output value;

concurrently displaying said first and second errors on display means;

repeating said first and second calculating steps and said display step as learning process of the model until a comparison of said first and second errors indicates an overlearning of the model;

stopping said repeating steps in response to a user's instruction based on said displayed errors; and, automatically saving in storing means parameters for determining the adjusted calculation method at a time when said first error becomes the smallest from a beginning of said learning.

* * * * *